US012256419B2

(12) United States Patent
Zhang et al.

(10) Patent No.: US 12,256,419 B2
(45) Date of Patent: Mar. 18, 2025

(54) INTERFERENCE MITIGATION NEGOTIATION BETWEEN NETWORK ENTITIES

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 17/562,674

(22) Filed: Dec. 27, 2021

(65) Prior Publication Data

US 2023/0209587 A1 Jun. 29, 2023

(51) Int. Cl.
H04W 72/00 (2023.01)
H04B 7/08 (2006.01)
H04W 72/541 (2023.01)
H04W 72/542 (2023.01)
H04W 72/566 (2023.01)
H04L 5/00 (2006.01)

(52) U.S. Cl.
CPC .......... *H04W 72/542* (2023.01); *H04B 7/088* (2013.01); *H04W 72/541* (2023.01); *H04W 72/569* (2023.01); *H04L 5/0055* (2013.01)

(58) Field of Classification Search
None
See application file for complete search history.

(56) References Cited

U.S. PATENT DOCUMENTS

| | | | |
|---|---|---|---|
| 2015/0146542 A1 | 5/2015 | Xia et al. | |
| 2017/0237478 A1* | 8/2017 | Kwak | H04B 7/0639 370/329 |
| 2019/0215086 A1* | 7/2019 | Kwak | H04B 17/24 |
| 2019/0239245 A1* | 8/2019 | Davydov | H04L 5/0048 |
| 2019/0342057 A1 | 11/2019 | Rico Alvarino et al. | |
| 2020/0052767 A1* | 2/2020 | Wang | H04B 7/0695 |
| 2020/0077286 A1 | 3/2020 | Liu | |

(Continued)

FOREIGN PATENT DOCUMENTS

| | | | | |
|---|---|---|---|---|
| EP | 3031283 A2 * | 6/2016 | ............ | H04W 24/08 |
| EP | 4022850 A1 * | 7/2022 | ........... | H04B 7/0626 |

(Continued)

*Primary Examiner* — Gerald A Smarth
(74) *Attorney, Agent, or Firm* — Patterson & Sheridan LLP

(57) ABSTRACT

Certain aspects of the present disclosure provide techniques for interference mitigation negotiation between network entities. An example method performed by a first network entity includes receiving, via different receive beams of the first network entity, a plurality of reference signals (RSs) from a second network entity associated with different transmit beams of the second network entity, transmitting, based on the plurality of RSs, downlink (DL) transmission recommendation information to the second network entity for a transmission window, and taking one or more actions related to receiving one or more uplink (UL) transmissions via one or more receive beams during the transmission window based, at least in part, on the DL transmission recommendation information.

28 Claims, 9 Drawing Sheets

(56) References Cited

U.S. PATENT DOCUMENTS

| | | | |
|---|---|---|---|
| 2020/0221323 A1* | 7/2020 | Xu | H04L 5/0025 |
| 2020/0260358 A1* | 8/2020 | Ratnam | H04B 7/024 |
| 2020/0275482 A1* | 8/2020 | Oh | H04W 72/0453 |
| 2021/0219283 A1* | 7/2021 | Xue | H04W 28/26 |
| 2022/0095240 A1 | 3/2022 | Ying et al. | |
| 2022/0182843 A1 | 6/2022 | Park et al. | |
| 2022/0278788 A1 | 9/2022 | Pedersen et al. | |
| 2022/0408275 A1 | 12/2022 | Awada et al. | |
| 2023/0262499 A1 | 8/2023 | Zhang et al. | |
| 2023/0328782 A1 | 10/2023 | Zhang et al. | |
| 2024/0259837 A1 | 8/2024 | Soldati et al. | |

FOREIGN PATENT DOCUMENTS

| | | | | |
|---|---|---|---|---|
| WO | WO-2019192410 A1 * | 10/2019 | | H04L 5/003 |
| WO | WO-2021012129 A1 * | 1/2021 | | H04B 17/327 |
| WO | WO-2023212405 A1 * | 11/2023 | | |

* cited by examiner

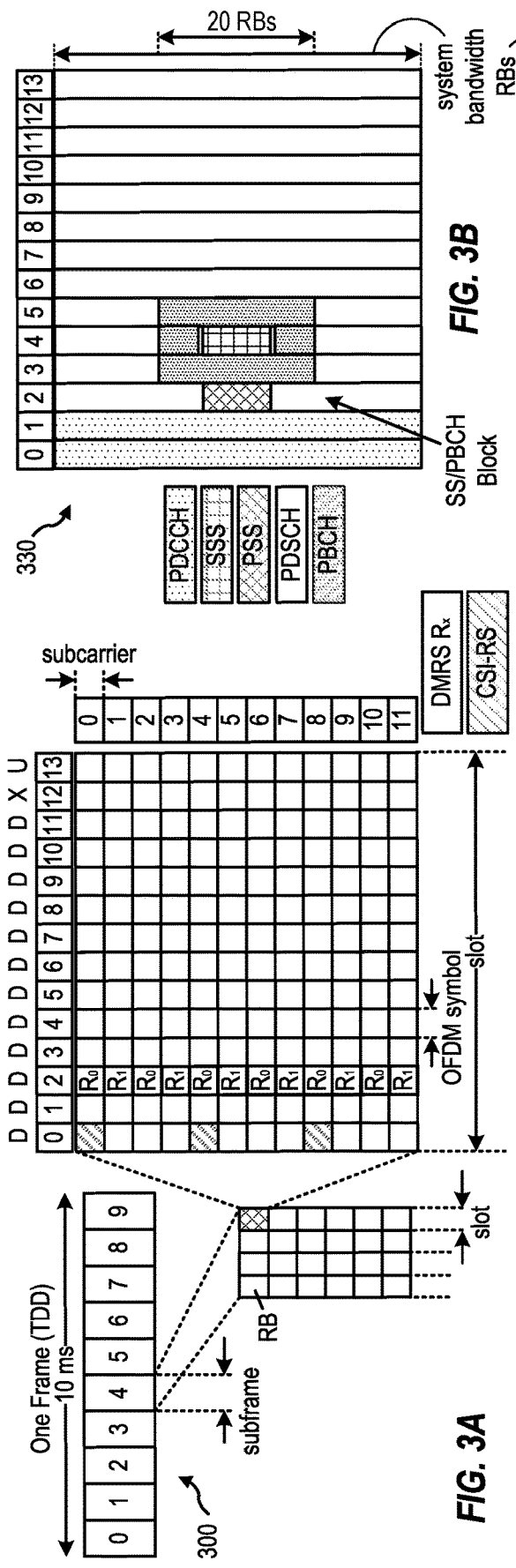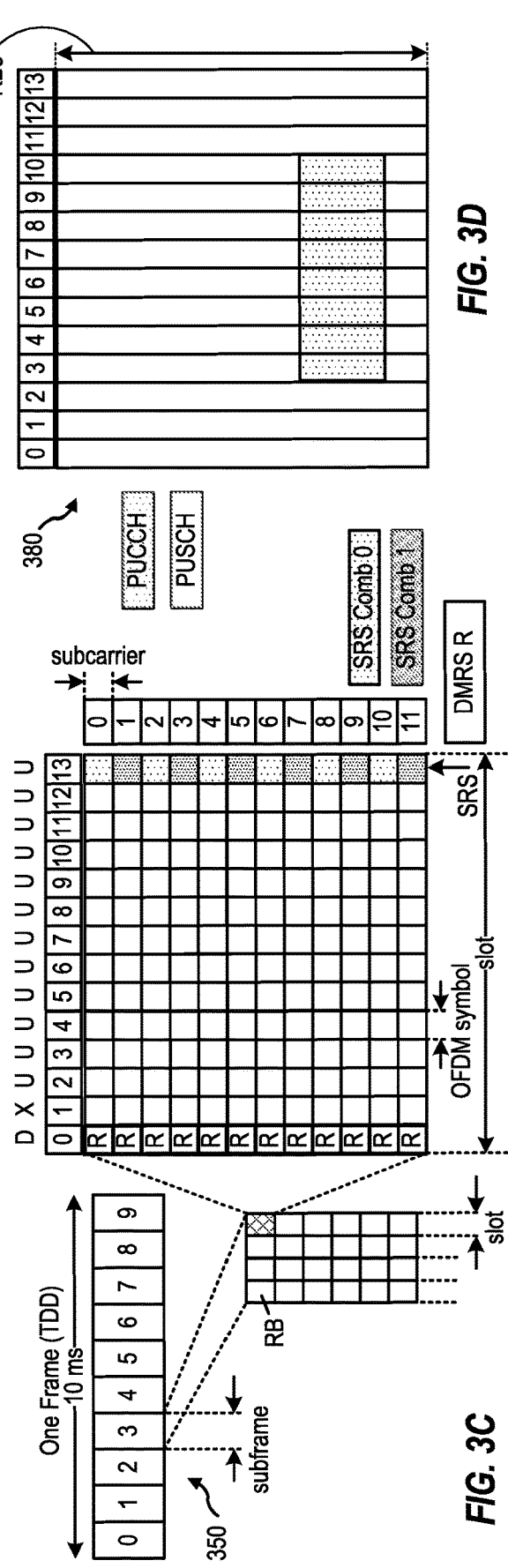

800

METHOD, PERFORMED BY A SECOND NETWORK ENTITY, FOR INTERFERENCE MITIGATION NEGOTIATION BETWEEN NETWORK ENTITIES

↓ 810

TRANSMITTING A PLURALITY OF REFERENCE SIGNALS (RSS) TO A FIRST NETWORK ENTITY ASSOCIATED WITH DIFFERENT TRANSMIT BEAMS OF THE SECOND NETWORK ENTITY

 820

RECEIVING, BASED ON THE PLURALITY OF RSS, DL TRANSMISSION RECOMMENDATION INFORMATION FROM THE FIRST NETWORK ENTITY FOR A TRANSMISSION WINDOW

 830

TAKING ONE OR MORE ACTIONS RELATED TO TRANSMITTING ONE OR MORE DL TRANSMISSIONS VIA ONE OR MORE TRANSMIT BEAMS OF THE DIFFERENT TRANSMIT BEAMS DURING THE TRANSMISSION WINDOW BASED, AT LEAST IN PART, ON THE DL TRANSMISSION RECOMMENDATION INFORMATION

*FIG. 8*

INTERFERENCE MITIGATION NEGOTIATION BETWEEN NETWORK ENTITIES

INTRODUCTION

Aspects of the present disclosure relate to wireless communications, and more particularly, to techniques for interference mitigation negotiation between network entities.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a first network entity. The method includes receiving, via different receive beams of the first network entity, a plurality of reference signals (RSs) from a second network entity associated with different transmit beams of the second network entity, transmitting, based on the plurality of RSs, downlink (DL) transmission recommendation information to the second network entity for a transmission window, and taking one or more actions related to receiving one or more uplink (UL) transmissions via one or more receive beams during the transmission window based, at least in part, on the DL transmission recommendation information.

Another aspect provides a method for wireless communication by a second network entity. The method includes transmitting a plurality of reference signals (RSs) to a first network entity associated with different transmit beams of the second network entity, receiving, based on the plurality of RSs, DL transmission recommendation information from the first network entity for a transmission window, and taking one or more actions related to transmitting one or more DL transmissions via one or more transmit beams of the different transmit beams during the transmission window based, at least in part, on the DL transmission recommendation information.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A, 3B, 3C, and 3D depict various example aspects of data structures for a wireless communication network.

FIG. 8 is a flow diagram illustrating example operations for wireless communication by a second network entity.

DETAILED DESCRIPTION

Aspects of the present disclosure provide apparatuses, methods, processing systems, and computer-readable mediums for interference mitigation negotiation between network entities. For example, in some cases, transmissions by one network entity, such as downlink (DL) transmissions from a first base station, may cause interference to transmissions to another network entity within a transmission window, such as to uplink (UL) transmissions to a second base station. In such cases, the first base station may be known as an aggressor base station and the second base station may be known as a victim base station. This interference can cause the UL transmissions to not be correctly received by the second base station. In such cases, the second base station would then have to indicate to its associated UE to retransmit the UL transmissions, consuming unnecessarily additional time and frequency resources within the wireless communications network. Moreover, power resources may be wasted having to retransmit these UL transmissions unnecessarily.

Accordingly, aspects of the present disclosure provide techniques for interference mitigation that may involve facilitating negotiation between network entities (e.g., the first and second base stations). For example, in some cases, the second base station (e.g., victim base station) may generate and transmit DL transmission recommendation information to the first base station (e.g., aggressor base station) for the transmission window in which the second base station is to receive the UL transmissions. In some cases, the DL transmission recommendation information may recommend one or more transmit beams for the first base station to use for DL transmission during the transmission window or one or more transmit beams for the first base station not to use for the DL transmissions during the transmission window.

Accordingly, when the aggressor base station adheres to using the recommended transmit beams and/or not using the non-recommended transmit beams for the DL transmissions in the transmission window, the UL transmissions to be received by the victim base station within the transmission window may be protected against interference from the aggressor base station, avoiding the wasted time and frequency resources in the wireless communications network as well as wasted power resources at UEs associated with the victim base station having to perform UL retransmissions.

Introduction to Wireless Communication Networks

Figure 1:
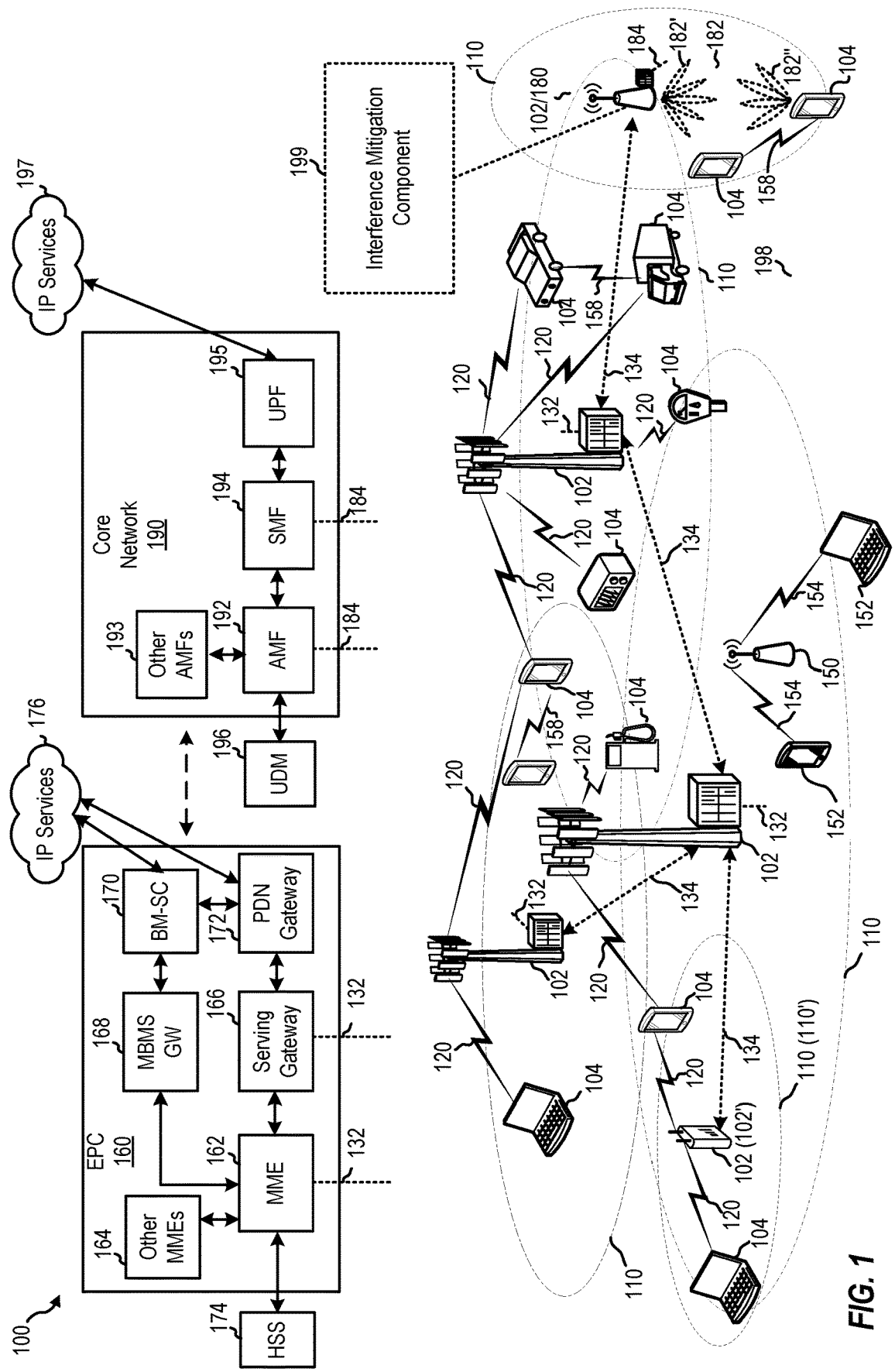
FIG. 1 is a block diagram conceptually illustrating an example wireless communication network.

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Figure 6:
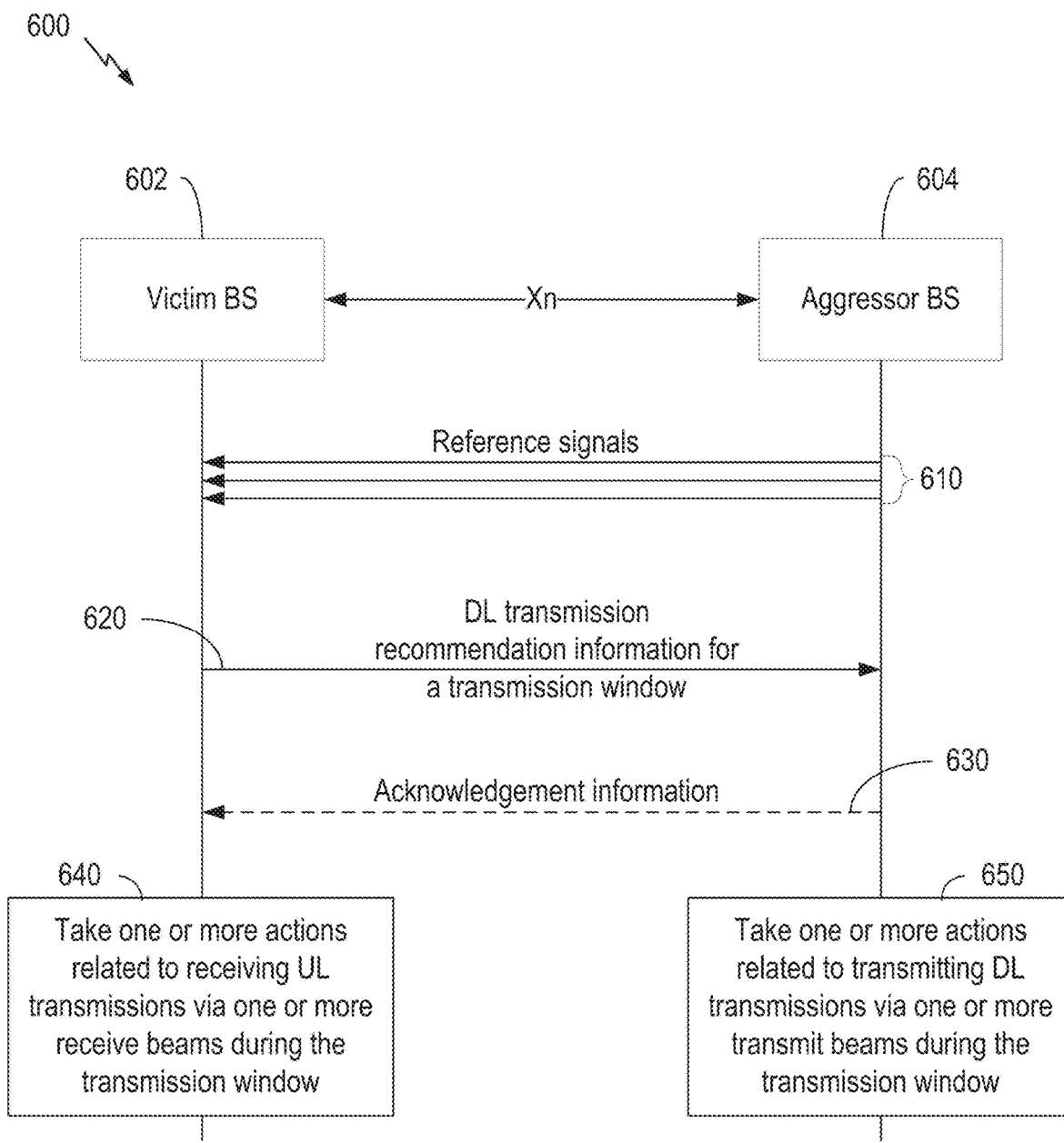
FIG. 6 is a call flow diagram illustrating example operations for interference mitigation negotiation between network entities.
Figure 7:
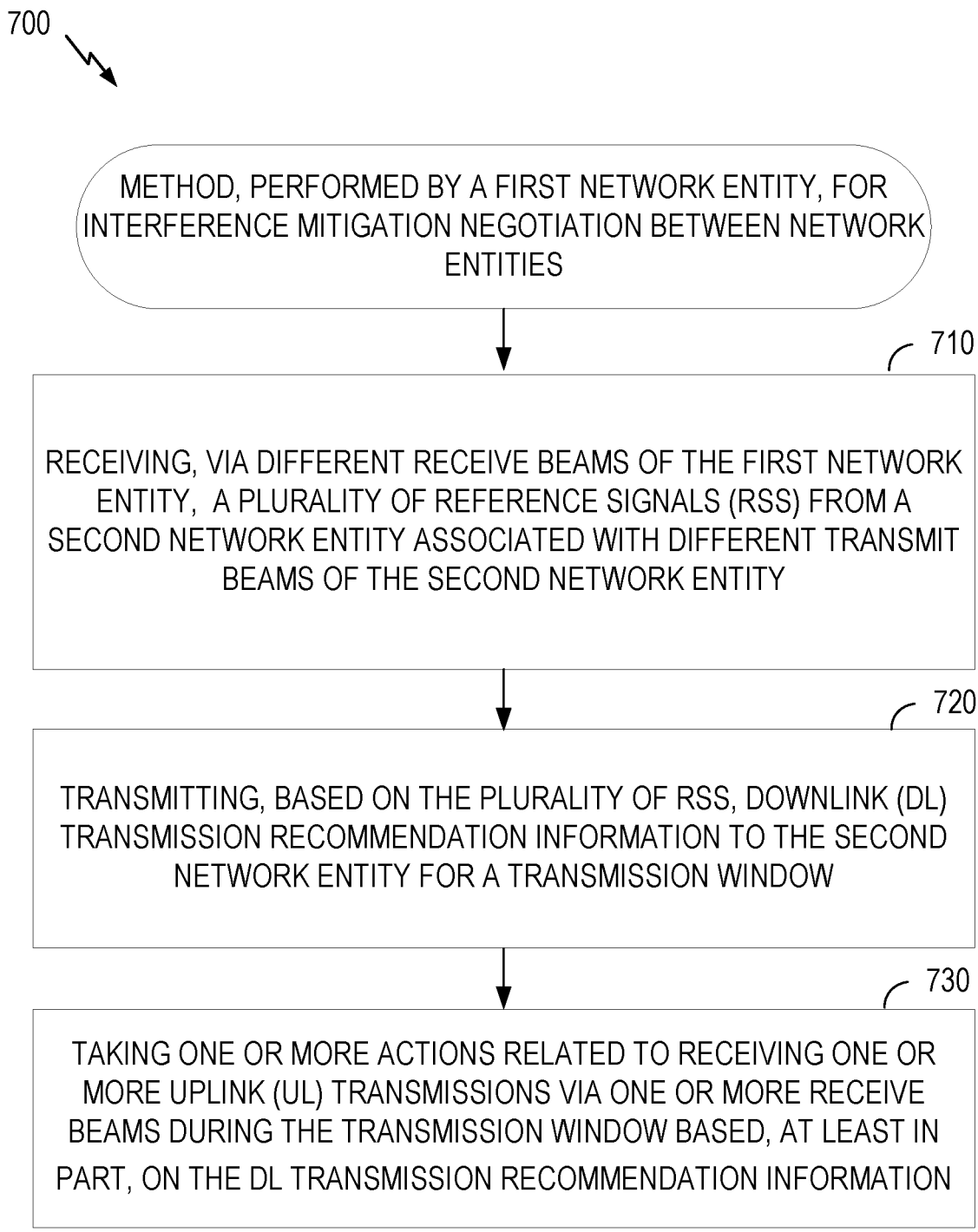
FIG. 7 is a flow diagram illustrating example operations for wireless communication by a first network entity.

Wireless communication network 100 includes interference mitigation component 199, which may be configured to perform the operations of one or more of FIGS. 6-8, as well as other operations described herein for interference mitigation negotiation between network entities.

Figure 2:
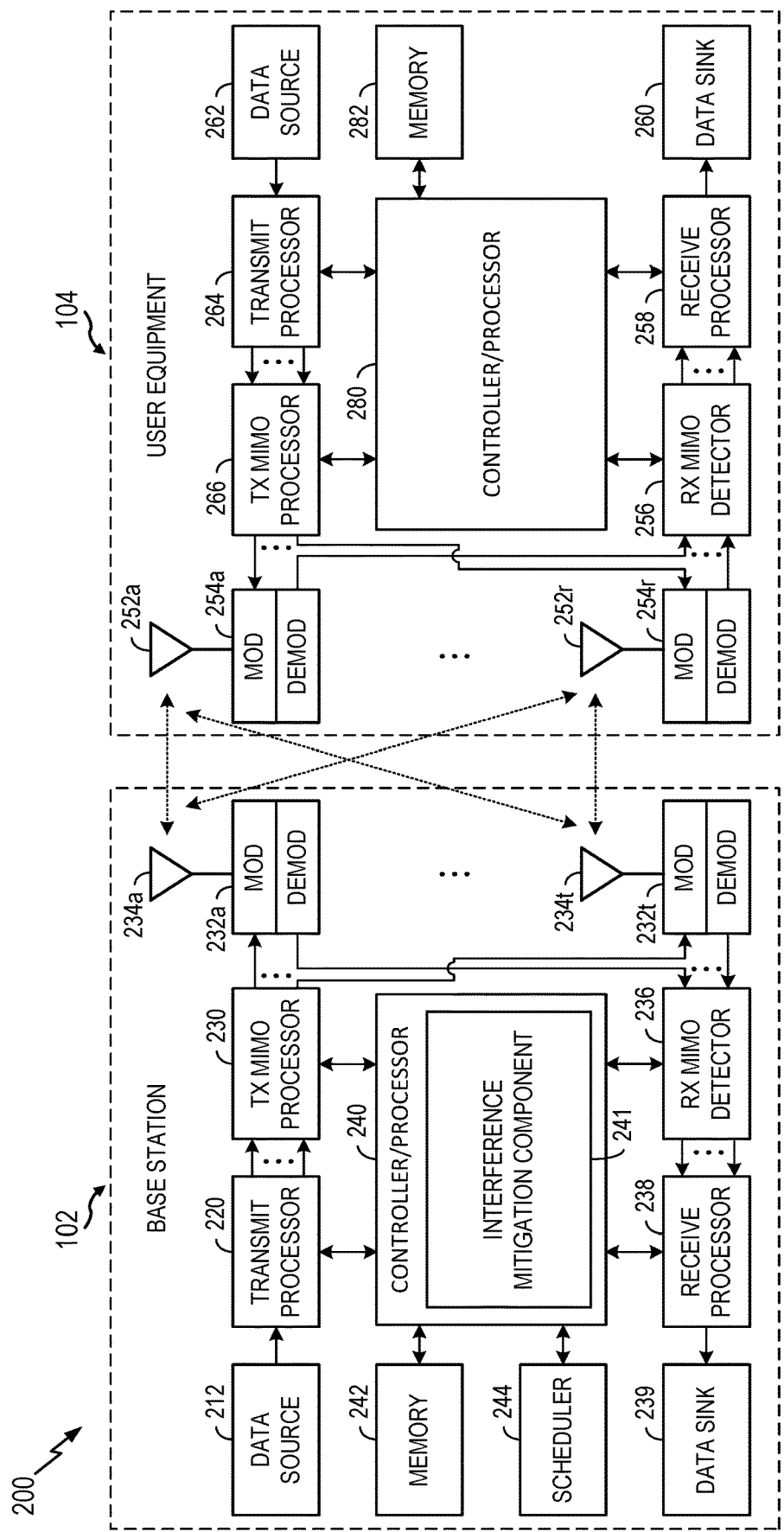
FIG. 2 is a block diagram conceptually illustrating aspects of an example of a base station and user equipment.

FIG. 2 depicts aspects of an example BS 102 and a UE 104. Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes interference mitigation component 241, which may be representative of interference mitigation component 199 of FIG. 1. Notably, while depicted as an aspect of controller/processor 240, interference mitigation component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Introduction to Multi Antenna Panel Communication

In certain systems, such as the wireless communication network 100 of FIG. 1, UEs and BSs may be able to transmit or receive transmissions using multiple antennas, beams, and/or antenna panels (e.g., antenna element arrays). An antenna panel may comprise a collection of transceiver units (TXRUs) that are capable of generating an analog beam. In some cases, when a dual-polarized array is used, the one beam may correspond to two antenna ports. In some cases, same sets or different sets of antenna panels can be used for DL reception and UL transmission. For example, in some cases, the same set of antenna panels may be used for both DL reception and UL transmission while in other cases different sets of antenna panels could be used for DL reception as compared to UL transmission.

Additionally, antenna panels can be associated with the same as well as different numbers of antenna ports, a number of beams, and/or an effective isotropic radiated power (EIRP). In some cases, while different antenna panels may share a same number of beams, there may not be beam correspondence across different antenna panels. Further, in some cases, each antenna panel may be associated with the same or independent operation parameters, such as power control (PC) parameters, a fast Fourier transform timing window, a time advance (TA) parameter, and the like. Additionally, each antenna panel of the UE may be associated with a particular panel identifier (ID) or an antenna panel group ID. In some cases, the antenna panel ID or antenna panel group ID may include one or more of a beam group ID, a transmission configuration indicator (TCI) state pool ID, a sounding reference signal (SRS) resource group ID, a control resource set (CORESET) pool ID, or a closed loop power control index.

In some cases, the capability to perform transmissions using multiple panels may be especially useful for higher frequency transmission, such as millimeter wave transmissions described above. In some cases, the transmissions associated with a UE may be received from or transmitted to a serving BS or transmission reception point (TRP) via a Uu interface. Generally, transmissions using multiple antenna panels may allow for increased throughput (e.g., by simultaneously or concurrently transmitting/receiving data to/from the BS using the multiple antenna panels) and/or increased reliability (e.g., by sending/receiving the same information using the multiple antenna panels). Such transmissions may be referred to as multi-panel transmissions.

Introduction to Full Duplex and Half Duplex Communication

As noted above, in some cases, wireless communication devices, such as UEs and BSs, may communicate using multiple antenna panels. In some cases, the multiple antenna panels may be used for half-duplex (HD) communication, such as in current 5G new radio (NR) communication systems, in which downlink (DL) and uplink (UL) transmissions are transmitted non-simultaneously (e.g., transmitted in different time resources). HD communication may be considered baseline behavior in Release 15 (R-15) and 16 (R-16) of 5G NR. In other cases, the use of multiple antenna panels may allow for full duplex (FD) communication whereby uplink (UL) and downlink (DL) transmissions may be performed simultaneously (e.g., in the same time resources). For example, in some cases, UL transmission by the UE may be performed on one panel while DL reception may be performed simultaneously on another panel of the UE. Likewise, at a BS, DL transmission by the BS may be performed on one antenna panel while UL reception may be performed on another antenna panel.

FD capability may be conditioned on beam separation (e.g., frequency separation or spatial separation) and may still be subject to certain self-interference between UL and DL (e.g., UL transmission directly interferes with DL reception) as well as clutter echo (e.g., where UL transmission echoes affect UL transmission and/or DL reception). However, while FD capability may be subject to certain interference, FD capability provides for reduced transmission and reception latency (e.g., it may be possible to receive DL transmissions in an UL-only slot), increased spectrum efficiency (e.g., per cell and/or per UE), and more efficient resource utilization.

Figure 4A:
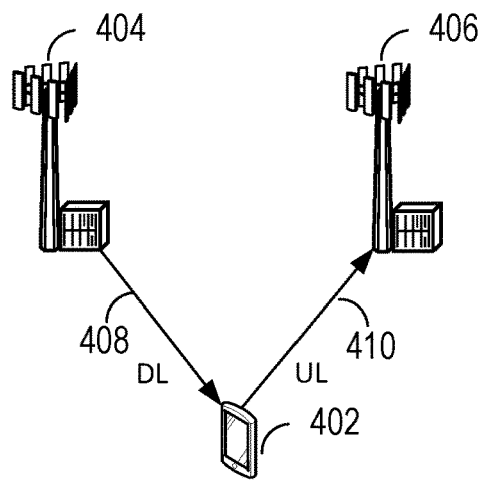
FIGS. 4A, 4B, and 4C illustrates different full-duplex use cases within a wireless communication network.
Figure 4B:
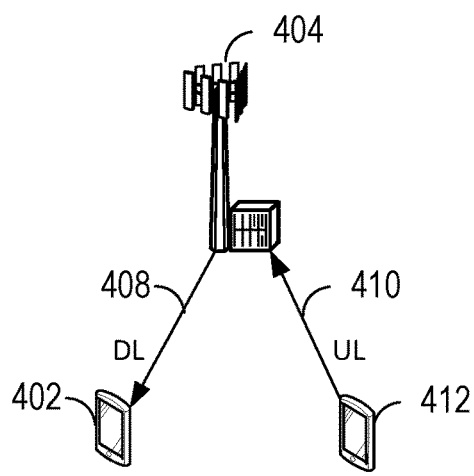
Figure 4C:
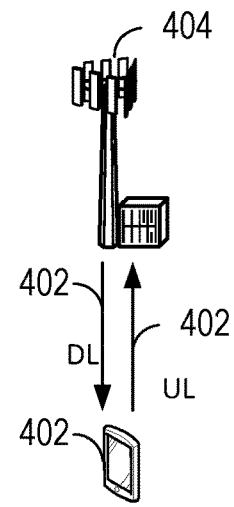

FIGS. 4A-4C illustrates different FD use cases within a wireless communication network, such as the wireless communication network 100. For example, FIG. 4A illustrates a first FD use case involving transmission between one UE 402 and two base stations (or multiple transmission reception points (mTRP)), BS 404 and BS 406. In some cases, UE 402 may be representative of UE 104 of FIG. 1 and BSs 404, 406 may be representative of BS 102 of FIG. 1. As shown, the UE 402 may simultaneously receive DL transmissions 408 from the BS 404 and transmit UL transmissions 410 to the BS 406. In some cases, the DL transmissions 408 and UL transmissions 410 may be performed using different antenna panels to facilitate the simultaneous transmission and reception.

A second FD use case is illustrated in FIG. 4B involving two different UEs and one BS. As illustrated, the UE 402 may receive DL transmissions 408 from the BS 404 while another UE 412 may simultaneously transmit UL transmission 410 to the BS 404. Thus, in this example, BS 404 is conducting simultaneous uplink and downlink communications.

A third FD use case is illustrated in FIG. 4C involving one BS and one UE. As illustrated, the UE 402 may receive DL transmissions 408 from the BS 404 and may simultaneously transmit UL transmissions 410 to the BS 404. As noted above, such simultaneous reception/transmission by the UE 402 may be facilitated by different antenna panels.

Table 1, below, illustrates various example scenarios in which each of the FD use cases may be used.

TABLE 1

| Base Station | UE | FD use case |
| --- | --- | --- |
| FD disabled | FD disabled | Baseline R-15/16 5G behavior |
| FD disabled | FD enabled | Use case #1 (FIG. 4A) for mTRP |
| FD enabled | FD disabled | Use case #2 (FIG. 4B) + R-16 IAB |
| FD enabled | FD enabled | Use case #3 (FIG. 4C) |

As shown in Table 1, if FD capability is disabled at both the base station and UE, the baseline R-15 and R-16 5G behavior may be used (e.g., HD communication). If FD capability is disabled at the BS but enabled at the UE, the UE may operate according to the first example FD use case shown in FIG. 4A in which the UE may communicate with two different TRPs simultaneously (e.g., simultaneous UL and DL transmissions) using two different antenna panels. If FD is enabled at the BS but disabled at the UE (e.g., the UE is not capable of FD), the BS may operate according to the second example FD use case shown in FIG. 4B in which the BS may communicate with two different UEs simultaneously (e.g., simultaneous UL and DL transmissions) using two different antenna panels. Finally, if FD is enabled at both the BS and the UE, the BS and UE may operate according to the third example FD use case shown in FIG. 4C in which the BS and UE may communicate with each other simultaneously on the UL and DL, each of the BS and UE using different antenna panels for UL and DL transmissions.

FD communication may be facilitated through the use of frequency division multiplexing (FDM) or spatial division multiplexing (SDM). In FDM, the simultaneous UL and DL transmissions may be transmitted in the same time resources but on separate frequency bands separated by some guard band. In SDM, the simultaneous UL and DL transmissions may transmitted on the same time and frequency resources but spatially separated into different, directional transmission beams. Such FD communication contrasts with HD communication that uses time division multiplexing (TDM) in which UL and DL transmissions are scheduled on the same or different frequency resources, but different time resources.

Aspects Related to Interference Mitigation Negotiation Between Network Entities

Figure 5A:
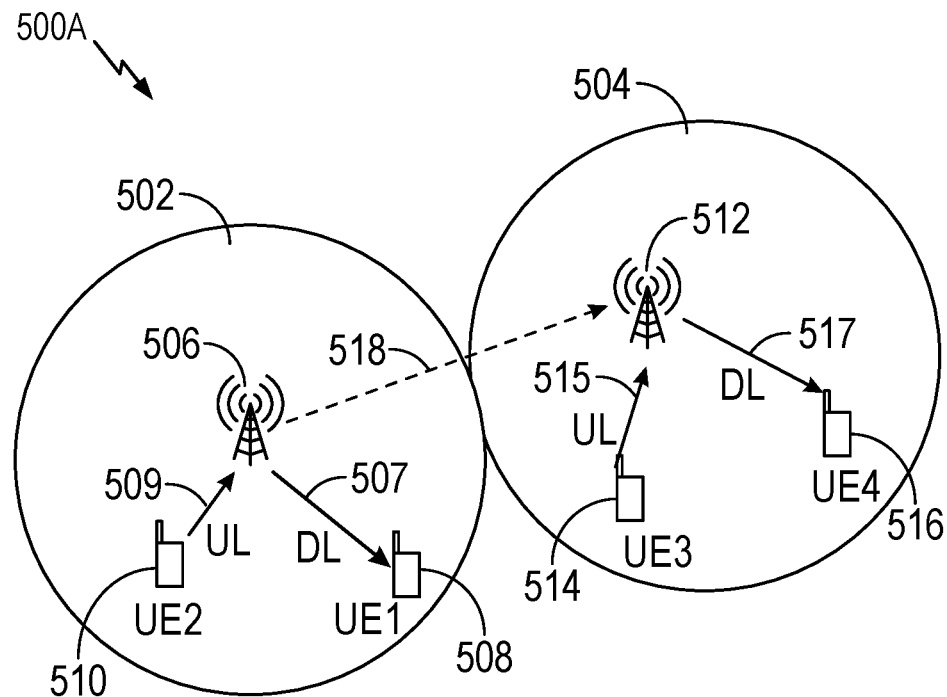
FIGS. 5A and 5B illustrate example interference scenarios in wireless communication networks.
Figure 5B:
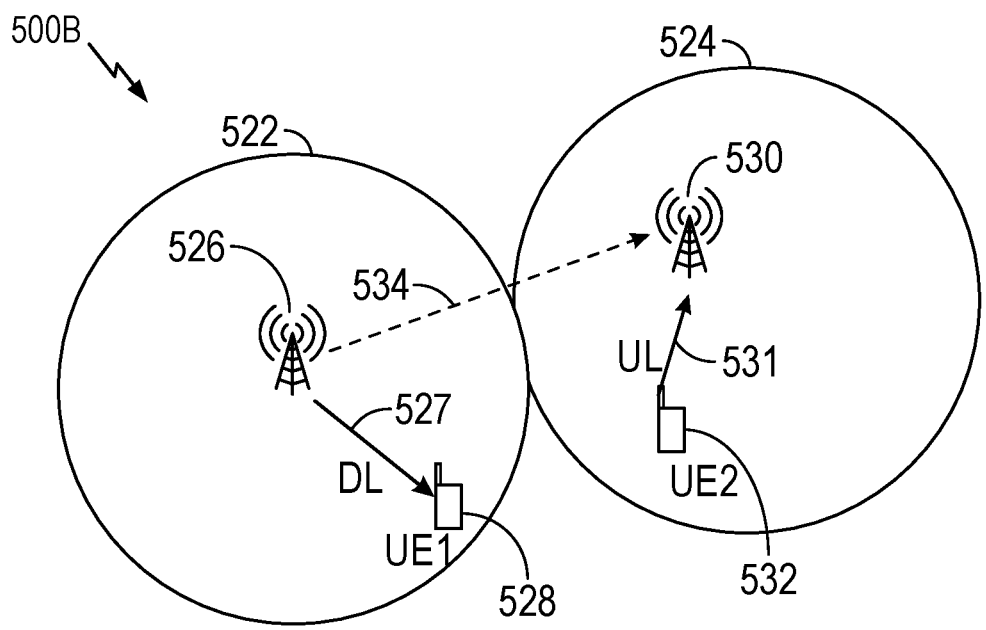

As noted above, FD communication provides for reduced transmission and reception latency and increased spectrum efficiency; however, wireless communications devices, such as base stations, that use FD communication may still be susceptible to certain interferences, such as interference from neighboring base stations, known as cross link interference or downlink-to-uplink interference. FIGS. 5A and 5B illustrate interference scenarios that may occur within wireless communications networks 500A and 500B in which FD and HD communications, respectively, may be used. In some cases, the wireless communications networks 500A and 500B may be examples of the wireless communications network 100 of FIG. 1.

FIG. 5A illustrates an example interference scenario in a wireless communications network 500A in which downlink transmissions from one FD base station (e.g., an aggressor base station) to a first UE causes cross link interference to the uplink transmissions by a second UE to a second FD base station (e.g., a victim base station).

For example, as illustrated, the wireless communications network 500A includes a first cell 502 and a second cell 504. The first cell 502 includes a first FD base station 506, which is capable of FD communication with a first UE 508 and a second UE 510. For example, as shown, the first FD base station 506 may be capable of transmitting downlink (DL) transmissions 507 to the first UE 508 while simultaneously receiving uplink (UL) transmissions 509 from the second UE 510. Similarly, the second cell 504 includes a second FD base station 512, which is capable of FD communication with a third UE 514 and a fourth UE 516. For example, as shown, the second FD base station 512 may be capable of transmitting DL transmissions 517 to the fourth UE 516 while simultaneously receiving UL transmissions 515 from the third UE 514. In some cases, the first FD base station 506 and second FD base station 512 may be examples of the BS 102 illustrated in FIGS. 1 and 2. Likewise, the first UE 508, the second UE 510, the third UE 514, and the fourth UE 516 may be examples of the UE 104 illustrated in FIGS. 1 and 2.

In some cases, because the first cell 502 and second cell 504 are located adjacent to each other, transmissions by the first FD base station 506 may impact transmissions to the second FD base station 512 and vice versa. For example, in some cases, the DL transmissions 507 from the first FD base station 506 have the potential to cause crosslink interference 518 to the UL transmissions 515 from the third UE 514 to the second FD base station 512. In this scenario, the first FD base station 506 may be known as an aggressor base station while the second FD base station 512 may be known as a victim base station.

FIG. 5B illustrates a similar interference scenario in a wireless communications network 500B in which downlink transmissions from one HD base station (e.g., an aggressor base station) to a first UE causes cross link interference to the uplink transmissions by a second UE to a second HD base station (e.g., a victim base station). This interference scenario can arise when the first and second HD base stations are configured with flexible and misaligned time division duplexing (TDD) patterns, resulting in DL transmissions from the first HS base station overlapping with the UL transmissions to the second HD base station.

For example, as illustrated, the wireless communications network 500B includes a first cell 522 and a second cell 524. The first cell 522 includes a first HD base station 526, which is capable of HD communication with a first UE 528. Similarly, the second cell 524 includes a second HD base station 530, which is capable of HD communication with a second UE 532. In some cases, the first HD base station 526 and second HD base station 530 may be examples of the BS 102 illustrated in FIGS. 1 and 2. Likewise, the first UE 528 and the second UE 532 may be examples of the UE 104 illustrated in FIGS. 1 and 2.

Generally, it may be advantageous for the first HD base station 526 and the second HD base station 530 to be configured with a same TDD pattern, such that each base station is configured to transmit DL transmission at the same time and receive UL transmissions at the same time, avoiding crosslink interference. However, there may be instances in which the first HD base station 526 and the second HD base station 530 are configured with flexible and misaligned TDD patterns, resulting in overlapping UL and DL transmissions between the first HD base station 526 and the second HD base station 530. For example, as illustrated, in some cases, the first HD base station 526 may be configured to transmit DL transmissions 527 to the first UE 528 at the same time that the second HD base station 530 is configured to receive UL transmissions 531 from the second UE 532. In such cases, the DL transmissions 527 by the first HD base station 526 may cause crosslink interference 534 to the UL transmissions 531 received by the second HD base station 530. In this scenario, the first HD base station 526 may be known as an aggressor base station while the second HD base station 530 may be known as a victim base station.

Whether experienced in the FD scenario illustrated in FIG. 5A or the HD scenario illustrated in FIG. 5B, crosslink interference is disadvantageous and can lead to certain negative effects. For example, crosslink interference can cause the UL transmission to not be correctly received by the second base station (e.g., victim base station). In such cases, the second base station would then have to indicate to its associated UE (e.g., the third UE 514 in FIG. 5A or the second UE 532 in FIG. 5B) to retransmit the UL transmissions, unnecessarily consuming additional time and frequency resources within the wireless communications networks 500A and 500B. Moreover, power resources may be wasted having to retransmit these UL transmissions unnecessarily.

Therefore, aspects of the present disclosure provide techniques for interference mitigation in wireless communication networks. In some cases, such techniques for interference mitigation may involve facilitating negotiation between network entities. For example, as will be explained in greater detail below, a victim base station may receive, via different receive beams, a plurality of reference signals via different receive beams from an aggressor base station. The victim base station may then generate and transmit DL transmission recommendation information to the aggressor base station for a transmission window. The DL transmission recommendation information may recommend one or more transmit beams for the aggressor base station to use for DL transmission during the transmission window or one or more transmit beams for the aggressor base station not to use for the DL transmissions during the transmission window.

In some cases, the one or more transmit beams for the aggressor base station to use may include transmit beams that cause interference equal to or below a threshold to receive beams used by the victim base station in the transmission window to receive UL transmissions. Additionally, the one or more transmit beams for the aggressor base station to not use may include transmit beams that may cause interference above the threshold to receive beams used by the victim base station in the transmission window to receive UL transmissions. Accordingly, when the aggressor base station adheres to using the recommended transmit beams and/or not using the non-recommended transmit beams for the DL transmissions in the transmission window, the UL transmissions to be received by the victim base station within the transmission window may be protected against interference from the aggressor base station, avoiding the wasted time and frequency resources in the wireless communications network as well as wasted power resources at UEs associated with the victim base station having to perform UL retransmissions.

Example Call Flow Illustrating Operations for Interference Mitigation Negotiation Between Network Entities FIG. 6 is a call flow diagram illustrating example operations 600 between a first network entity, such as a first network entity 602, and a second network entity, such as a second network entity 604 for interference mitigation negotiation between network entities. In some cases, the first network entity 602 may be an example of the second FD base station 512 illustrated in FIG. 5A or the second HD base station illustrated in FIG. 5B. Additionally, in some cases, the second network entity 604 may be an example of the first FD base station 506 illustrated in FIG. 5A or the first HD base station 526 illustrated in FIG. 5B. Further, both the first network entity 602 and second network entity 604 may be examples of the BS 102 illustrated in FIGS. 1 and 2. In some cases, the first network entity 602 may be a victim BS while the second network entity 604 may be an aggressor BS. As described above, a victim BS is generally an FD or HD BS that experiences crosslink interference to UL transmissions (e.g., intended for the victim BS) from DL transmissions from the aggressor BS.

In some cases, each of the first network entity 602 and second network entity 604 may comprise a centralized unit (CU) and one or more distributed units (DUs). The CU may provide support for higher layers of a protocol stack such as a service data adaption protocol (SDAP) layer, a packet data convergence protocol (PDCP) layer, and a radio resource control (RRC) layer. Each DU may be able to support one or more cells and is responsible for managing scheduling and lower layers of the protocol stack, such as a radio link control (RLC) layer, a media access control (MAC) layer, and a physical (PHY) layer. Further, as shown in FIG. 6, an Xn interface may be established to facilitate communication between the first network entity 602 and second network entity 604, however, in other aspects, a different type of interface may be used.

As illustrated, the operations 600 illustrated in FIG. 6 begin at 610 with the first network entity 602 (e.g., victim BS) receiving, via different receive beams of the first network entity 602, a plurality of reference signals (RSs) from the second network entity 604 (e.g., aggressor BS) associated with different transmit beams of the second network entity 604. In other words, the first network entity 602 may receive a plurality of RSs each associated with a different transmit/receive beam pair between second network entity 604 and the first network entity 602.

In some cases, the first network entity 602 may use the plurality of RSs received from the second network entity 604 to determine which (downlink transmissions on) transmit beams of the second network entity 604 may cause interference above a threshold to (uplink transmissions on) receive beams of the first network entity 602. The first network entity 602 may then negotiate with the second network entity 604 to try to avoid this interference, for example, by recommending certain transmit beams for the second network entity 604 to use or not use within a particular transmit window in which the first network entity 602 is scheduled to receive UL transmissions via one or more receive beams.

For example, as shown at 620, the first network entity 602 transmits, based on the plurality of RSs, DL transmission recommendation information to the second network entity for a transmission window. In some cases, the first network entity 602 may transmit the DL transmission recommendation information via at least one of a backhaul network or over the air.

In some cases, the DL transmission recommendation information may indicate one or more transmit beams of the different transmit beams of the second network entity to use for one or more DL transmissions during the transmission window. In some cases, the DL transmission recommendation information may additionally or alternatively indicate one or more transmit beams of the different transmit beams of the second network entity to not use for one or more DL transmissions during the transmission window.

In some cases, when DL transmission recommendation information indicates the one or more transmit beams to use, the one or more transmit beams to use for the one or more DL transmissions during the transmission window may include transmit beams associated with interference metrics, determined by the first network entity 602 based on the plurality of RSs, less than or equal to an interference threshold metric. For example, when these transmit beams are less than or equal to the interference threshold, these transmit beams may not cause significant interference to the one or more receive beams used by the first network entity 602 for receiving UL transmissions in the transmission window. As such, it would be beneficial for the second network entity 604 to use these transmit beams to avoid this interference. In some cases, the DL transmission recommendation information transmitted by the first network entity 602 at 620 may further indicate the interference metrics for the one or more transmit beams to use.

In some cases, when DL transmission recommendation information indicates the one or more transmit beams to not use the one or more transmit beams to not use for the one or more DL transmissions during the transmission window comprise transmit beams associated with interference metrics, determined by the first network entity 602 based on the plurality of RSs, greater than an interference threshold metric. For example, when these transmit beams are greater than the interference threshold, these transmit beams may cause significant interference to the one or more receive beams used by the first network entity 602 for receiving UL transmissions in the transmission window. As such, it would be beneficial for the second network entity 604 to not use these transmit beams to avoid this interference. In some cases, the DL transmission recommendation information further indicates the interference metrics for the one or more transmit beams not to use.

In some cases, the first network entity 602 may include additional information within the DL transmission recommendation information to help the second network entity 604 in deciding whether to adhere to the DL transmission recommendation information (e.g., whether to adhere to using the recommended transmit beams or to not use the non-recommended beams). For example, in some cases, the first network entity 602 may include within the DL transmission recommendation information a traffic priority associated with one or more UL transmissions of the first network entity 602 during the transmission window. For example, in some cases, the first network entity 602 may indicate that the one or more UL transmissions have a high priority (e.g., such as ultra-reliable low-latency (URLLC) traffic) or a low priority (e.g., such as enhanced mobile broadband (eMBB) traffic). In some cases, the first network entity 602 may include within the DL transmission recommendation information a traffic type associated with the one or more UL transmissions during the transmission window, such URLLC traffic, eMBB traffic, and the like. In some cases, the first network entity 602 may include within the DL transmission recommendation information a signaling type associated with the one the one or more UL transmissions during the transmission window, such as whether the one or more UL transmissions are control transmissions or data transmissions.

In some cases, the first network entity 602 may additionally or alternatively indicate in the DL transmission recommendation information the one or more receive beams to be used by the first network entity 602 for receiving the one or more UL transmissions during the transmission window. In some cases, the first network entity 602 may indicate the one or more receive beams by including beam identifiers of the one or more receive beams within the DL transmission recommendation information. In some cases, the first network entity 602 may additionally or alternatively indicate in the DL transmission recommendation information a beam pattern associated with the one or more receive beams to be used by the first network entity 602 for receiving the one or more UL transmissions during the transmission window. For example, the beam pattern may indicate that the first network entity 602 will use receive beam 2, then receive beam 1, and then receive beam 3 to receive the one or more UL transmissions in the transmission window. Other beam patterns may be used and the preceding beam pattern is just one example and is not intended to be limiting.

In some cases, the first network entity 602 may additionally or alternatively indicate in the DL transmission recommendation information time and frequency resources associated with the one or more UL transmissions during the transmission window. In some cases, the first network entity 602 may also indicate loading information for the time and frequency resources associated with the one or more UL transmissions during the transmission window. For example, in some cases, the loading information may indicate a number of users per time and frequency resource.

In some cases, the first network entity 602 may additionally or alternatively indicate in the DL transmission recommendation information loading information for the one or more receive beams to be used by the first network entity for receiving the one or more UL transmissions during the transmission window. In some cases, the loading information may indicate a number of users per receive beam of the one or more receive beams. Additionally, in some cases, the loading information may indicate a percentage of resource elements to be used per receive beam of the one or more receive beams.

In some cases, the first network entity 602 may additionally or alternatively indicate in the DL transmission recommendation information a TDD pattern associated with the one or more UL transmissions to be received by the first network entity 602 in the transmission window.

Once the first network entity 602 has transmitted the DL transmission recommendation information to the second network entity 604 at 620 in FIG. 6, the first network entity 602 may optionally receive acknowledgement information from the second network entity 604 for the DL transmission recommendation information, indicating whether the second network entity 604 will adhere to recommendations included within the DL transmission recommendation information or not.

For example, in some cases, the acknowledgement information may comprise a positive acknowledgment (ACK), indicating that the second network entity 604 will adhere to the DL transmission recommendation information in the transmission window. In other cases, the acknowledgement information may comprise a negative acknowledgment (NACK), indicating that the second network entity 604 will not adhere to the DL transmission recommendation information in the transmission window.

Thereafter, as shown at 640 in FIG. 6, the first network entity 602 may take one or more actions related to receiving the one or more UL transmissions via one or more receive beams during the transmission window based, at least in part, on the DL transmission recommendation information and the acknowledgment information (if received from the second network entity 604). Likewise, as shown at 650, the second network entity 604 may take one or more actions related to transmitting one or more DL transmissions via one or more transmit beams during the transmission window based, at least in part, on the DL transmission recommendation information.

In some cases, taking the one or more actions by the first network entity 602 related to receiving the one or more UL transmissions may include various actions. As will be explained in greater detail below, the various actions that may be taken by the first network entity 602 at 640 in FIG. 6 may include actions such as dropping reception of the one or more UL transmissions, receiving the one or more UL transmissions in the transmission window (even if there is potential for interference caused by the second network entity 604), receiving the one or more UL transmissions in the transmission window, receiving the one or more UL transmissions in a subsequent transmission window, and the like. Similarly, in view of the DL transmission recommendation information, the second network entity 604 may take one or more actions related to transmitting the one or more DL transmissions in the transmission window, such as proceeding ahead with transmitting the one or more DL transmissions regardless of the DL transmission recommendation information, dropping transmission of the one or more DL transmissions in the transmission window, or transmitting the one or more DL transmissions in a subsequent transmission window.

In some cases, the first network entity 602 may take the one or more actions at 640 based on additional information received from the second network entity 604 (e.g., in the acknowledgement information or in other messaged exchanged between the first network entity 602 and second network entity 604), which may help the first network entity 602 in deciding whether or not (and how) to receive the one or more UL transmissions via the one or more receive beams. In some cases, the additional information indicated by the second network entity 604 may be the same or similar to the type of additional information included by the first network entity 602 in the DL transmission recommendation information (e.g., traffic priority, traffic type, signaling type, loading information, TDD pattern, transmit beam patter, etc.).

For example, in some cases, the second network entity 604 may indicate within the acknowledgement information a traffic priority associated with one or more DL transmissions to be transmitted by the second network entity 604 during the transmission window. In some cases, for example, when the acknowledgement information comprises a NACK, the traffic priority indicated in the acknowledgement information may indicate a higher traffic priority for the one or more DL transmissions to be transmitted by the second network entity 604 in the transmission window than a traffic priority associated with the one or more UL transmissions to be transmitted by the first network entity 602 in the transmission window.

For example, in some cases, the second network entity 604 may receive the traffic priority associated with the one or more UL transmissions from the first network entity 602 in the DL transmission recommendation information. The second network entity 604 may then determine that the one or more DL transmissions to be transmitted by the second network entity 604 have a higher priority than the one or more UL transmissions to be transmitted by the first network entity 602 and, in response, decide not to adhere to the DL transmission recommendation information. As a result, the second network entity 604 may transmit a NACK to the first network entity 602, indicating the higher traffic priory of the one or more DL transmissions and that the second network entity 604 will not adhere to the DL transmission recommendation information.

When the acknowledgement information includes a NACK, taking action at 640 in FIG. 6 may, in some cases, include the first network entity 602 dropping the one or more UL transmissions to be received via the one or more receive beams during the transmission window. For example, the first network entity 602 may decide to drop reception of the one or more UL transmissions if the one or more UL transmissions are expected to be interfered (e.g., above a threshold) by the one or more DL transmissions to be transmitted by the second network entity 604 in the transmission window.

In some cases, taking action at 640 in FIG. 6 may, in some cases, include the first network entity 602 receiving the one or more UL transmissions via the one or more receive beams during the transmission window regardless of the NACK. For example, in some cases, regardless of the NACK, the first network entity 602 may still schedule an associated UE to transmit the one or more UL transmissions to the first network entity 602. However, in such cases, the one or more UL transmissions to be received by the first network entity 602 may be interfered with by the one or more DL transmissions transmitted by the second network entity 604.

In some cases, the first network entity 602 may decide to still schedule the UE to transmit the one or more UL transmissions depending on a distance of the UE to the first network entity 602. For example, if the UE is located near the first network entity 602, the interference caused by the one or more DL transmissions from the second network entity 604 may be minimal and the first network entity 602 may still be able to correctly receive the one or more UL transmissions from the UE. In such cases, the first network entity 602 may take action to schedule the UE to transmit the one or more UL transmissions to be received by the first network entity 602 regardless of the NACK. However, if the UE is located further away, the interference caused by the one or more DL transmissions from the second network entity 604 may be significant and the first network entity 602 may not be able to correctly receive the one or more UL transmissions from the UE. In such cases, the first network entity 602 may take action to not schedule the UE to transmit the one or more UL transmissions and instead drop reception of the one or more UL transmissions. Alternatively, even when the UE is located further away from the first network entity 602, the first network entity 602 may still take action to schedule UE to transmit the one or more UL transmissions by commanding the UE to increase a transmission power associated with the one or more UL transmissions so that the one or more UL transmissions can be properly received by the first network entity 602.

In some cases, the first network entity 602 may take action at 640 to receive the one or more UL transmissions via the one or more receive beams during the transmission window regardless of the NACK by selecting one or more receive beams that do not interference with the one or more transmit beams to be used by the second network entity 604 to transmit the one or more DL transmissions in the transmission window, thereby avoiding the potential for interference.

In some cases, when the acknowledgement information includes a NACK, taking action at 640 in FIG. 6 may, in some cases, include the first network entity 602 scheduling and receiving the one or more UL transmissions via the one or more receive beams in a subsequent transmission window, for example, to avoid any interference caused by the one or more DL transmissions by the second network entity 604 in the transmission window.

In some cases, as noted above, the acknowledgement information may include a positive ACK, indicating that the second network entity 604 will adhere to the one or more transmit beams to use and/or one or more transmit beams not to use. In such cases, taking action at 640 in FIG. 6 may include receiving the one or more UL transmissions via the one or more receive beams, wherein the transmit beams of the second network entity 604 used to transmit the one or more DL transmissions do not interfere with the one or more UL beams of the first network entity 602 used to receive the one or more UL transmissions.

As noted above, the second network entity 604 may take one or more actions at 650 related to transmitting one or more DL transmissions via one or more transmit beams during the transmission window based, at least in part, on the DL transmission recommendation information. For example, in some cases, the second network entity 604 may decide to ignore the one or more transmit beams to use and/or one or more transmit beams not to use recommended by the first network entity 602 in the DL transmission recommendation information and, instead, proceed ahead with transmitting the one or more DL transmissions via the one or more transmit beams in the transmission window.

In other cases, the second network entity 604 may decide to drop transmission of the one or more DL transmissions in the transmission window and/or transmit the one or more DL transmissions in a subsequent transmission window. In other cases, the second network entity 604 may decide to proceed ahead with transmitting the one or more DL transmissions in the transmission window, but may select one or more DL beams that do not interfere with the one or more receive beams to be used by the first network entity 602 for receiving the one or more UL transmissions in the transmission window, thereby avoiding the potential for interference.

Aspects Related to Negotiation Signaling Between Network Entities

As noted above, the first network entity 602 and the second network entity 604 may each, in some cases, exchange additional information with the other to help the other decide whether (and how) to communicate transmissions within a transmission window (e.g., traffic priority, traffic type, signaling type, loading information, TDD pattern, transmit beam patter, etc.). In some cases, this additional information (including the DL transmission recommendation information) may be signaled in different manners depending on the type of network entities that the first network entity 602 and the second network entity 604 are.

For example, in some cases, the first network entity 602 comprises a DU of a first base station (BS) and the second network entity comprises a second DU of the BS. In such cases, transmitting the DL transmission recommendation information as well as the additional information (e.g., traffic priority, traffic type, signaling type, loading information, TDD pattern, transmit beam patter, etc.) to the second network entity 604 (and vice versa) may comprise transmitting the DL transmission recommendation information and the additional information from the first DU to the second DU via a CU of the first BS. For example, in some cases, the first DU (e.g., first network entity 602) may use F1 signaling to transmit the DL transmission recommendation information and the additional information to the CU of the first BS. The CU of the first BS may then use additional F1 signaling to forward the DL transmission recommendation information and the additional information to the second DU of the first BS. Likewise, the second DU (e.g., second network entity 604) may also transmit its own additional information, as described above, to the CU of the first BS using F1 signaling, which may then forward this additional information to the first DU using additional F1 signaling.

In other cases, the first network entity 602 comprises a first DU of the first BS while the second network entity 604 comprises a second DU of a second BS. In such cases, transmitting the DL transmission recommendation information as well as the additional information (e.g., traffic priority, traffic type, signaling type, loading information, TDD pattern, transmit beam patter, etc.) to the second network entity 604 (and vice versa) may comprise transmitting the DL transmission recommendation information and the additional information from the first DU to the second DU via a first CU of the first BS and a second CU of the second BS. For example, in some cases, the first DU (e.g., first network entity 602) may use F1 signaling to transmit the DL transmission recommendation information and the additional information to the first CU of the first BS. The first CU may then forward the DL transmission recommendation information and the additional information to the second CU of the second BS via Xn signaling on an Xn interface between the first BS and the second BS. The second CU may then forward the DL transmission recommendation information and the additional information to the second DU (e.g., second network entity 604) of the second BS using F1 signaling.

In some cases, the second network entity 604 may receive DL transmission recommendation information from multiple network entities (including the first network entity 602) and may use the DL transmission recommendation information received from the multiple network entities to determine a scheduling configuration for transmitting the one or more DL transmissions. For example, in such cases, the second network entity 604 may comprise CU of a BS. In this case, the second network entity 604 (e.g., CU) may receive additional DL transmission recommendation information from one or more additional network entities for the transmission window (e.g., in addition to receiving the DL transmission recommendation information from the first network entity 602). Thereafter, the second network entity 604 may determine, based on the DL transmission recommendation information from the first network entity 602 and the additional DL transmission recommendation information from the one or more additional network entities, scheduling information for the one or more DL transmissions to be transmitted by the second network entity 604. Thereafter, the second network entity 604 (e.g., CU) may send the scheduling information to a DU of the BS to transmit the one or more DL transmissions. The second network entity (e.g., CU) may also send the scheduling information to at least one of the first network entity or the one or more additional network entities. In some cases, the second network entity 604 may transmit this scheduling information as the additional information included within, for example, the acknowledgement information transmitted by the second network entity at 630 in FIG. 6.

Example Methods for Interference Mitigation Negotiation Between Network Entities FIG. 7 is a flow diagram illustrating example operations 700 for wireless communication. The operations 700 may be performed, for example, by a first network entity, such as a BS (e.g., BS 102 of FIGS. 1 and 2) or one or more components within a BS (e.g., CU, DU, etc.). The operations 700 may be implemented as software components that are executed and run on one or more processors (e.g., controller/processor 240 of FIG. 2). Further, the transmission and reception of signals by the BS in operations 700 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 700 begin, at 710, with receiving, via different receive beams of the first network entity, a plurality of reference signals (RSs) from a second network entity associated with different transmit beams of the second network entity.

At 720, the first network entity transmits, based on the plurality of RSs, downlink (DL) transmission recommendation information to the second network entity for a transmission window.

At 730, the first network entity takes one or more actions related to receiving one or more uplink (UL) transmissions via one or more receive beams during the transmission window based, at least in part, on the DL transmission recommendation information.

In some cases, the DL transmission recommendation information indicates at least one of: one or more transmit beams of the different transmit beams of the second network entity to use for one or more DL transmissions during the transmission window, or one or more transmit beams of the different transmit beams of the second network entity to not use for one or more DL transmissions during the transmission window.

In some cases, the DL transmission recommendation information further indicates at least one of: one or more time and frequency resources for the second network entity to use for the one or more DL transmissions during the transmission window, or one or more time and frequency resources for the second network entity to not use for the one or more DL transmissions during the transmission window.

In some cases, when DL transmission recommendation information indicates the one or more transmit beams to use: the one or more transmit beams to use for the one or more DL transmissions during the transmission window comprise transmit beams associated with interference metrics, determined based on the plurality of RSs, less than or equal to an interference threshold metric, and the DL transmission recommendation information further indicates the interference metrics for the one or more transmit beams to use.

In some cases, when DL transmission recommendation information indicates the one or more transmit beams to not use: the one or more transmit beams to not use for the one or more DL transmissions during the transmission window comprise transmit beams associated with interference metrics, determined based on the plurality of RSs, greater than an interference threshold metric, and the DL transmission recommendation information further indicates the interference metrics for the one or more transmit beams not to use.

In some cases, the DL transmission recommendation information indicates at least one of: a traffic priority associated with the one or more UL transmissions of the first network entity during the transmission window, a traffic type associated with the one or more UL transmissions during the transmission window, or a signaling type associated with the one the one or more UL transmissions during the transmission window.

In some cases, the DL transmission recommendation information indicates at least one of: the one or more receive beams to be used by the first network entity for receiving the one or more UL transmissions during the transmission window, or a beam pattern associated with the one or more receive beams to be used by the first network entity for receiving the one or more UL transmissions during the transmission window.

In some cases, the DL transmission recommendation information indicates time and frequency resources associated with the one or more UL transmissions during the transmission window.

In some cases, the DL transmission recommendation information indicates loading information for the time and frequency resources associated with the one or more UL transmissions during the transmission window.

In some cases, the DL transmission recommendation information indicates loading information for the one or more receive beams to be used by the first network entity for receiving the one or more UL transmissions during the transmission window. Additionally, in some cases, the loading information indicates at least one of: a number of users per receive beam of the one or more receive beams, or a percentage of resource elements to be used per receive beam of the one or more receive beams.

In some cases, the DL transmission recommendation information indicates a time division duplexing (TDD) pattern associated with the one or more UL transmissions.

In some cases, operations 700 may further include receiving acknowledgement information from the second network entity for the DL transmission recommendation information.

In some cases, the acknowledgement information comprises a negative acknowledgement (NACK), indicating that the second network entity will not adhere to the DL transmission recommendation information during the transmission window.

In some cases, the acknowledgement information includes an indication of a traffic priority associated with one or more DL transmissions to be transmitted by the second network entity during the transmission window.

In some cases, the traffic priority associated with the one or more DL transmissions is higher than a traffic priority associated with the one or more UL transmissions.

In some cases, the acknowledgement information includes an indication of one or more transmit beams of the different transmit beams to be used by the second network entity for transmitting one or more DL transmissions during the transmission window.

In some cases, taking the one or more actions in block 730 may include one of: dropping, based on the NACK, the one or more UL transmissions to be received via the one or more receive beams during the transmission window, receiving the one or more UL transmissions via the one or more receive beams during the transmission window regardless of the NACK, or receiving the one or more UL transmissions via the one or more receive beams in a subsequent transmission window, or receiving the one or more UL transmissions via the one or more receive beams, wherein the different transmit beams of the second network entity do not interfere with the one or more UL beams of the first network entity.

In some cases, the first network entity comprises a first distributed unit (DU) of a base station (BS) and the second network entity comprises a second DU of the BS. In such cases, transmitting the DL transmission recommendation information to the second network entity in block 720 may include transmitting the DL transmission recommendation information from the first DU to the second DU via a centralized unit (CU) of the BS.

In some cases, the first network entity comprises a first distributed unit (DU) of a first base station (BS) and the second network entity comprises a second DU of a second BS. In such cases, transmitting the DL transmission recommendation information to the second network entity in block 720 may include transmitting the DL transmission recommendation information from the first DU to the second DU via a first centralized unit (CU) of the first BS and a second CU of the second BS.

In some cases, transmitting the DL transmission recommendation information in block 720 may include transmitting the DL transmission recommendation information via at least one of a backhaul network or over the air.

FIG. 8 is a flow diagram illustrating example operations 800 for wireless communication. The operations 800 may be performed, for example, by a second network entity, such as a BS (e.g., BS 102 of FIGS. 1 and 2) or one or more components within a BS (e.g., CU, DU, etc.). The operations 800 may be implemented as software components that are executed and run on one or more processors (e.g., controller/processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 800 begin, at 810, with transmitting a plurality of reference signals (RSs) to a first network entity associated with different transmit beams of the second network entity.

In block 820, the second network entity receives, based on the plurality of RSs, downlink (DL) transmission recommendation information from the first network entity for a transmission window.

In block 830, the second network entity takes one or more actions related to transmitting one or more DL transmissions via one or more transmit beams of the different transmit beams during the transmission window based, at least in part, on the DL transmission recommendation information.

In some cases, the DL transmission recommendation information indicates at least one of: one or more transmit beams of the different transmit beams of the second network entity to use for the one or more DL transmissions during the transmission window, or one or more transmit beams of the different transmit beams of the second network entity to not use for the one or more DL transmissions during the transmission window.

In some cases, the DL transmission recommendation information further indicates at least one of: one or more time and frequency resources for the second network entity to use for the one or more DL transmissions during the transmission window, or one or more time and frequency resources for the second network entity to not use for the one or more DL transmissions during the transmission window.

In some cases, when DL transmission recommendation information indicates the one or more transmit beams to use: the one or more transmit beams to use for the one or more DL transmissions during the transmission window comprise transmit beams associated with interference metrics, determined based on the plurality of RSs, less than or equal to an interference threshold metric, and the DL transmission recommendation information further indicates the interference metrics for the one or more transmit beams to use.

In some cases, when DL transmission recommendation information indicates the one or more transmit beams to not use: the one or more transmit beams to not use for the one or more DL transmissions during the transmission window comprise transmit beams associated with interference metrics, determined based on the plurality of RSs, greater than an interference threshold metric, and the DL transmission recommendation information further indicates the interference metrics for the one or more transmit beams not to use.

In some cases, the DL transmission recommendation information indicates at least one of: a traffic priority associated with one or more uplink transmissions to be received by the first network entity during the transmission window, a traffic type associated with one or more uplink transmissions to be received by the first network entity during the transmission window, or a signaling type associated with one or more uplink transmissions to be received by the first network entity during the transmission window.

In some cases, the DL transmission recommendation information indicates at least one of: one or more receive beams to be used by the first network entity for receiving one or more uplink transmissions during the transmission window, or a beam pattern associated with one or more receive beams to be used by the first network entity for receiving one or more uplink transmissions during the transmission window.

In some cases, the DL transmission recommendation information indicates time and frequency resources associated with one or more uplink transmissions to be received by the first network entity during the transmission window.

In some cases, the DL transmission recommendation information indicates loading information for time and frequency resources associated with one or more uplink transmissions to be received by the first network entity during the transmission window.

In some cases, the DL transmission recommendation information indicates loading information for one or more receive beams to be used by the first network entity for receiving one or more uplink transmissions during the transmission window. In such cases, the loading information indicates at least one of: a number of users per receive beam of the one or more receive beams, or a percentage of resource elements to be used per receive beam of the one or more receive beams.

In some cases, the DL transmission recommendation information indicates a time division duplexing (TDD) pattern associated with one or more uplink transmissions to be received by the first network entity during the transmission window.

In some cases, operations 800 may further include transmitting acknowledgement information to the first network entity for the DL transmission recommendation information.

In some cases, the acknowledgement information comprises a negative acknowledgement (NACK), indicating that the second network entity will not adhere to the DL transmission recommendation information during the transmission window.

In some cases, the acknowledgement information includes an indication of a traffic priority associated with the one or more DL transmissions to be transmitted by the second network entity during the transmission window.

In some cases, the traffic priority associated with the one or more DL transmissions is higher than a traffic priority associated with one or more uplink transmissions to be received by the first network entity during the transmission window.

In some cases, the acknowledgement information includes an indication of the one or more transmit beams of the different transmit beams to be used by the second network entity for transmitting the one or more DL transmissions during the transmission window.

In some cases, taking the one or more actions in block 830 may include transmitting, based on the NACK, the one or more DL transmissions via one or more transmit beams during the transmission window.

In some cases, operations 800 may further include transmitting an acknowledgement (ACK), indicating that the second network entity will adhere to the DL transmission recommendation information during the transmission window, wherein taking the one or more actions comprises dropping the one or more DL transmissions via one or more transmit beams during the transmission window based on the ACK.

In some cases, the first network entity comprises a first distributed unit (DU) of a base station (BS) and the second network entity comprises a second DU of the BS. In such cases, receiving the DL transmission recommendation information from the first network entity in block 820 may include receiving the DL transmission recommendation information from the first DU via a centralized unit (CU) of the BS.

In some cases, the first network entity comprises a first distributed unit (DU) of a first base station (BS) and the second network entity comprises a second DU of a second BS. In such cases, receiving the DL transmission recommendation information from the first network entity in block 820 may include receiving the DL transmission recommendation information from the first DU via a first centralized unit (CU) of the first BS and a second CU of the second BS.

In some cases, the second network entity comprises a centralized unit (CU) of a base station (BS). Further, in some cases, operations 800 may further include receiving additional DL transmission recommendation information from one or more additional network entities for a transmission window, determining, based on the DL transmission recommendation information from the first network entity any the additional DL transmission recommendation information from the one or more additional network entities, scheduling information for the one or more DL transmissions, sending the scheduling information to a distributed unit (DU) of the base station to transmit the one or more DL transmissions, and sending the scheduling information to at least one of the first network entity or the one or more additional network entities.

In some cases, receiving the DL transmission recommendation information in block 820 may include receiving the DL transmission recommendation information via at least one of a backhaul network or over the air.

In some cases, taking the one or more actions in block 830 may include one of: dropping the one or more DL transmissions via one or more transmit beams during the transmission window, transmitting the one or more DL transmissions via the one or more transmit beams in a subsequent transmission window, transmitting the one or more DL transmissions via the one or more transmit beams in the transmission window regardless of the DL transmission recommendation information, or transmitting the one or more DL transmissions via the one or more transmit beams in the transmission window, wherein the one or more transmit beams of the second network entity do not interfere with one or more receive beams of the first network entity.

Example Wireless Communication Devices

Figure 9:
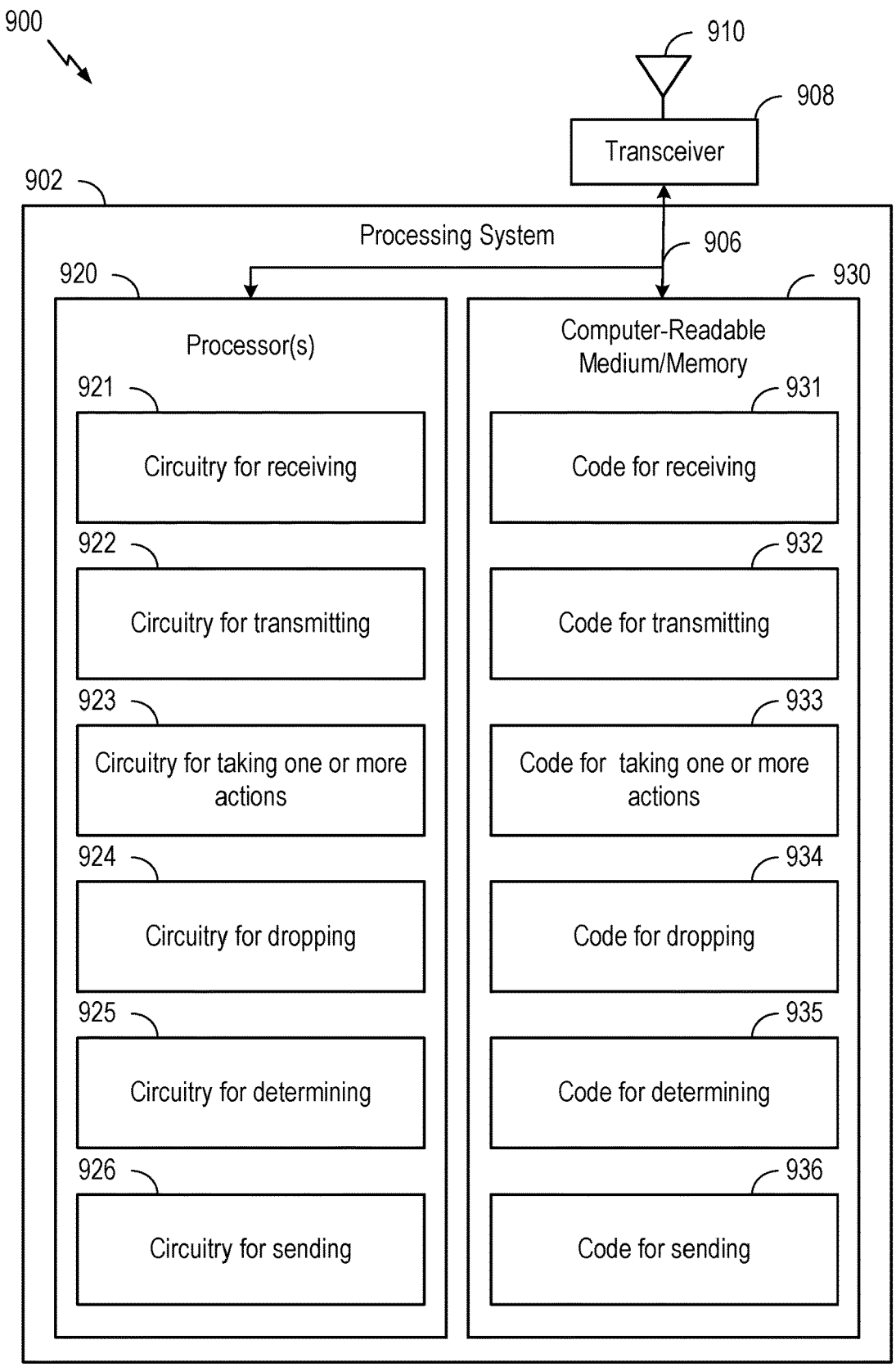
FIG. 9 depicts aspects of an example communications device.

FIG. 9 depicts an example communications device 900 that includes various components operable, configured, or adapted to perform operations for the techniques disclosed herein, such as the operations depicted and described with respect to FIGS. 6-8. In some examples, communication device 900 may be a network entity (e.g., first network entity 602 and/or second network entity 604), such as BS 102 as described, for example with respect to FIGS. 1 and 2, or one or more components of the BS 102 (e.g., a CU or DU).

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIGS. 6-8, or other operations for performing the various techniques discussed herein for interference mitigation negotiation between network entities.

In the depicted example, computer-readable medium/memory 930 stores code 931 for receiving, code 932 for transmitting, code 933 for taking one or more action, code 934 for dropping, code 935 for determining, and code 936 for sending.

In the depicted example, the one or more processors 920 include circuitry configured to implement the code stored in the computer-readable medium/memory 930, including circuitry 921 for receiving, circuitry 922 for transmitting, circuitry 923 for taking one or more actions, circuitry 924 for dropping, circuitry 925 for determining, and circuitry 926 for sending.

Various components of communications device 900 may provide means for performing the methods described herein, including with respect to FIGS. 6-8.

In some examples, means for transmitting or sending (or means for outputting for transmission) may include the transceivers 232 and/or antenna(s) 234 of the BS 102 illustrated in FIG. 2 and/or transceiver 908 and antenna 910 of the communication device 900 in FIG. 9.

In some examples, means for receiving (or means for obtaining) may include the transceivers 232 and/or antenna (s) 234 of the base station illustrated in FIG. 2 and/or transceiver 908 and antenna 910 of the communication device 900 in FIG. 9.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. Similarly, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 2.

In some examples, means for dropping, means for taking one or more actions, and means for determining, may include various processing system components, such as: the one or more processors 920 in FIG. 9, or aspects of the BS 102 depicted in FIG. 2, including receive processor 238, transmit processor 220, TX MIMO processor 230, and/or controller/processor 240 (including interference mitigation component 241).

Notably, FIG. 9 is an example, and many other examples and configurations of communication device 900 are possible.

Example Clauses

Implementation examples are described in the following numbered clauses:

Clause 1: A method of wireless communication by a first network entity, comprising: receiving, via different receive beams of the first network entity, a plurality of reference signals (RSs) from a second network entity associated with different transmit beams of the second network entity; transmitting, based on the plurality of RSs, downlink (DL) transmission recommendation information to the second network entity for a transmission window; and taking one or more actions related to receiving one or more uplink (UL) transmissions via one or more receive beams during the transmission window based, at least in part, on the DL transmission recommendation information.

Clause 2: The method of Clause 1, wherein the DL transmission recommendation information indicates at least one of: one or more transmit beams of the different transmit beams of the second network entity to use for one or more DL transmissions during the transmission window, or one or more transmit beams of the different transmit beams of the second network entity to not use for one or more DL transmissions during the transmission window.

Clause 3: The method of Clause 2, wherein the DL transmission recommendation information further indicates at least one of: one or more time and frequency resources for the second network entity to use for the one or more DL transmissions during the transmission window, or one or more time and frequency resources for the second network entity to not use for the one or more DL transmissions during the transmission window.

Clause 4: The method of any one of Clauses 2-3, wherein: when DL transmission recommendation information indicates the one or more transmit beams to use: the one or more transmit beams to use for the one or more DL transmissions during the transmission window comprise transmit beams associated with interference metrics, determined based on the plurality of RSs, less than or equal to an interference threshold metric, and the DL transmission recommendation information further indicates the interference metrics for the one or more transmit beams to use, and when DL transmission recommendation information indicates the one or more transmit beams to not use: the one or more transmit beams to not use for the one or more DL transmissions during the transmission window comprise transmit beams associated with interference metrics, determined based on the plurality of RSs, greater than an interference threshold metric, and the DL transmission recommendation information further indicates the interference metrics for the one or more transmit beams not to use.

Clause 5: The method of any one of Clauses 1-4, wherein the DL transmission recommendation information indicates at least one of: a traffic priority associated with the one or more UL transmissions of the first network entity during the transmission window, a traffic type associated with the one or more UL transmissions during the transmission window, or a signaling type associated with the one the one or more UL transmissions during the transmission window.

Clause 6: The method of any one of Clauses 1-5, wherein the DL transmission recommendation information indicates at least one of: the one or more receive beams to be used by the first network entity for receiving the one or more UL transmissions during the transmission window, or a beam pattern associated with the one or more receive beams to be used by the first network entity for receiving the one or more UL transmissions during the transmission window.

Clause 7: The method of any one of Clauses 1-6, wherein the DL transmission recommendation information indicates time and frequency resources associated with the one or more UL transmissions during the transmission window.

Clause 8: The method of Clause 7, wherein the DL transmission recommendation information indicates loading information for the time and frequency resources associated with the one or more UL transmissions during the transmission window.

Clause 9: The method of any one of Clauses 1-8, wherein: the DL transmission recommendation information indicates loading information for the one or more receive beams to be used by the first network entity for receiving the one or more UL transmissions during the transmission window, and the loading information indicates at least one of: a number of users per receive beam of the one or more receive beams, or a percentage of resource elements to be used per receive beam of the one or more receive beams.

Clause 10: The method of any one of Clauses 1-9, wherein the DL transmission recommendation information indicates a time division duplexing (TDD) pattern associated with the one or more UL transmissions.

Clause 11: The method of any one of Clauses 1-10, further comprising receiving acknowledgement information from the second network entity for the DL transmission recommendation information.

Clause 12: The method of Clause 11, wherein the acknowledgement information comprises a negative acknowledgement (NACK), indicating that the second network entity will not adhere to the DL transmission recommendation information during the transmission window.

Clause 13: The method of Clause 12, wherein the acknowledgement information includes an indication of a traffic priority associated with one or more DL transmissions to be transmitted by the second network entity during the transmission window.

Clause 14: The method of Clause 13, wherein the traffic priority associated with the one or more DL transmissions is higher than a traffic priority associated with the one or more UL transmissions.

Clause 15: The method of any one of Clauses 12-14, wherein the acknowledgement information includes an indication of one or more transmit beams of the different transmit beams to be used by the second network entity for transmitting one or more DL transmissions during the transmission window.

Clause 16: The method of any one of Clauses 12-15, wherein taking the one or more actions comprises one of: dropping, based on the NACK, the one or more UL transmissions to be received via the one or more receive beams during the transmission window, receiving the one or more UL transmissions via the one or more receive beams during the transmission window regardless of the NACK, or receiving the one or more UL transmissions via the one or more receive beams in a subsequent transmission window, or receiving the one or more UL transmissions via the one or more receive beams, wherein the different transmit beams of the second network entity do not interfere with the one or more UL beams of the first network entity.

Clause 17: The method of any one of Clauses 1-16, wherein: the first network entity comprises a first distributed unit (DU) of a base station (BS), the second network entity comprises a second DU of the BS, and transmitting the DL transmission recommendation information to the second network entity comprises transmitting the DL transmission recommendation information from the first DU to the second DU via a centralized unit (CU) of the BS.

Clause 18: The method of any one of Clauses 1-16, wherein: the first network entity comprises a first distributed unit (DU) of a first base station (BS), the second network entity comprises a second DU of a second BS, and transmitting the DL transmission recommendation information to the second network entity comprises transmitting the DL transmission recommendation information from the first DU to the second DU via a first centralized unit (CU) of the first BS and a second CU of the second BS.

Clause 19: The method of any one of Clauses 1-16, wherein transmitting the DL transmission recommendation information comprises transmitting the DL transmission recommendation information via at least one of a backhaul network or over the air.

Clause 20: A method of wireless communication by a second network entity, comprising: transmitting a plurality of reference signals (RSs) to a first network entity associated with different transmit beams of the second network entity; receiving, based on the plurality of RSs, DL transmission recommendation information from the first network entity for a transmission window; and taking one or more actions related to transmitting one or more DL transmissions via one or more transmit beams of the different transmit beams during the transmission window based, at least in part, on the DL transmission recommendation information.

Clause 21: The method of Clause 20, wherein the DL transmission recommendation information indicates at least one of: one or more transmit beams of the different transmit beams of the second network entity to use for the one or more DL transmissions during the transmission window, or one or more transmit beams of the different transmit beams of the second network entity to not use for the one or more DL transmissions during the transmission window.

Clause 22: The method of Clause 21, wherein the DL transmission recommendation information further indicates at least one of: one or more time and frequency resources for the second network entity to use for the one or more DL transmissions during the transmission window, or one or more time and frequency resources for the second network entity to not use for the one or more DL transmissions during the transmission window.

Clause 23: The method of any one of Clauses 21-22, wherein: when DL transmission recommendation information indicates the one or more transmit beams to use: the one or more transmit beams to use for the one or more DL transmissions during the transmission window comprise transmit beams associated with interference metrics, determined based on the plurality of RSs, less than or equal to an interference threshold metric, and the DL transmission recommendation information further indicates the interference metrics for the one or more transmit beams to use, and when DL transmission recommendation information indicates the one or more transmit beams to not use: the one or more transmit beams to not use for the one or more DL transmissions during the transmission window comprise transmit beams associated with interference metrics, determined based on the plurality of RSs, greater than an interference threshold metric, and the DL transmission recommendation information further indicates the interference metrics for the one or more transmit beams not to use.

Clause 24: The method of any one of Clauses 20-23, wherein the DL transmission recommendation information indicates at least one of: a traffic priority associated with one or more uplink transmissions to be received by the first network entity during the transmission window, a traffic type associated with one or more uplink transmissions to be received by the first network entity during the transmission window, or a signaling type associated with one or more uplink transmissions to be received by the first network entity during the transmission window.

Clause 25: The method of any one of Clauses 20-24, wherein the DL transmission recommendation information indicates at least one of: one or more receive beams to be used by the first network entity for receiving one or more uplink transmissions during the transmission window, or a beam pattern associated with one or more receive beams to be used by the first network entity for receiving one or more uplink transmissions during the transmission window.

Clause 26: The method of any one of Clauses 20-25, wherein the DL transmission recommendation information indicates time and frequency resources associated with one or more uplink transmissions to be received by the first network entity during the transmission window.

Clause 27: The method of any one of Clauses 20-26, wherein the DL transmission recommendation information indicates loading information for time and frequency resources associated with one or more uplink transmissions to be received by the first network entity during the transmission window.

Clause 28: The method of any one of Clauses 20-27, wherein: the DL transmission recommendation information indicates loading information for one or more receive beams to be used by the first network entity for receiving one or more uplink transmissions during the transmission window, and the loading information indicates at least one of: a number of users per receive beam of the one or more receive beams, or a percentage of resource elements to be used per receive beam of the one or more receive beams.

Clause 29: The method of any one of Clauses 20-28, wherein the DL transmission recommendation information indicates a time division duplexing (TDD) pattern associated with one or more uplink transmissions to be received by the first network entity during the transmission window.

Clause 30: The method of any one of Clauses 20-29, further comprising transmitting acknowledgement information to the first network entity for the DL transmission recommendation information.

Clause 31: The method of Clause 30, wherein the acknowledgement information comprises a negative acknowledgement (NACK), indicating that the second network entity will not adhere to the DL transmission recommendation information during the transmission window.

Clause 32: The method of Clause 31, wherein the acknowledgement information includes an indication of a traffic priority associated with the one or more DL transmissions to be transmitted by the second network entity during the transmission window.

Clause 33: The method of Clause 32, wherein the traffic priority associated with the one or more DL transmissions is higher than a traffic priority associated with one or more uplink transmissions to be received by the first network entity during the transmission window.

Clause 34: The method of any one of Clauses 31-33, wherein the acknowledgement information includes an indication of the one or more transmit beams of the different transmit beams to be used by the second network entity for transmitting the one or more DL transmissions during the transmission window.

Clause 35: The method of any one of Clauses 30-34, wherein taking the one or more actions comprises transmitting, based on the NACK, the one or more DL transmissions via one or more transmit beams during the transmission window.

Clause 36: The method of any one of Clauses 20-30, further comprising transmitting an acknowledgement (ACK), indicating that the second network entity will adhere to the DL transmission recommendation information during the transmission window, wherein taking the one or more actions comprises dropping the one or more DL transmissions via one or more transmit beams during the transmission window based on the ACK.

Clause 37: The method of any one of Clauses 20-36, wherein: the first network entity comprises a first distributed unit (DU) of a base station (BS), the second network entity comprises a second DU of the BS, and receiving the DL transmission recommendation information from the first network entity comprises receiving the DL transmission recommendation information from the first DU via a centralized unit (CU) of the BS.

Clause 38: The method of any one of Clauses 20-36, wherein: the first network entity comprises a first distributed unit (DU) of a first base station (BS), the second network entity comprises a second DU of a second BS, and receiving the DL transmission recommendation information from the first network entity comprises receiving the DL transmission recommendation information from the first DU via a first centralized unit (CU) of the first BS and a second CU of the second BS.

Clause 39: The method of any one of Clauses 20-36, wherein: the second network entity comprises a centralized unit (CU) of a base station (BS), the method further comprises: receiving additional DL transmission recommendation information from one or more additional network entities for a transmission window; determining, based on the DL transmission recommendation information from the first network entity any the additional DL transmission recommendation information from the one or more additional network entities, scheduling information for the one or more DL transmissions; sending the scheduling information to a distributed unit (DU) of the base station to transmit the one or more DL transmissions; and sending the scheduling information to at least one of the first network entity or the one or more additional network entities.

Clause 40: The method of any one of Clauses 20-36, wherein receiving the DL transmission recommendation information comprises receiving the DL transmission recommendation information via at least one of a backhaul network or over the air.

Clause 41: The method of any one of Clauses 20-40, wherein taking the one or more actions comprises one of: dropping the one or more DL transmissions via one or more transmit beams during the transmission window, transmitting the one or more DL transmissions via the one or more transmit beams in a subsequent transmission window, transmitting the one or more DL transmissions via the one or more transmit beams in the transmission window regardless of the DL transmission recommendation information, or transmitting the one or more DL transmissions via the one or more transmit beams in the transmission window, wherein the one or more transmit beams of the second network entity do not interfere with one or more receive beams of the first network entity.

Clause 42: An apparatus, comprising: a memory comprising executable instructions; and one or more processors configured to execute the executable instructions and cause the apparatus to perform a method in accordance with any one of Clauses 1-41.

Clause 43: An apparatus, comprising means for performing a method in accordance with any one of Clauses 1-41.

Clause 44: A non-transitory computer-readable medium comprising executable instructions that, when executed by one or more processors of an apparatus, cause the apparatus to perform a method in accordance with any one of Clauses 1-41.

Clause 45: A computer program product embodied on a computer-readable storage medium comprising code for performing a method in accordance with any one of Clauses 1-41.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to YMHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of interference mitigation negotiation between network entities in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (as in the example UE 104 of FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first network entity, comprising:
one or more processors configured to execute instructions stored on one or more memories and to cause the first network entity to:
receive, via different receive beams of the first network entity, a plurality of reference signals (RSs) from a second network entity associated with different transmit beams of the second network entity;
transmit, to the second network entity based on the plurality of RSs, downlink (DL) transmission recommendation information for the second network entity to use during a transmission window; and
take one or more actions related to receiving one or more uplink (UL) transmissions via one or more receive beams during the transmission window based, at least in part, on the DL transmission recommendation information.

2. The first network entity of claim 1, wherein the DL transmission recommendation information indicates at least one of:
one or more transmit beams of the different transmit beams of the second network entity to use for one or more DL transmissions during the transmission window,
one or more transmit beams of the different transmit beams of the second network entity to not use for one or more DL transmissions during the transmission window,
one or more time and frequency resources for the second network entity to use for the one or more DL transmissions during the transmission window, or
one or more time and frequency resources for the second network entity to not use for the one or more DL transmissions during the transmission window.

3. The first network entity of claim 2, wherein:
when DL transmission recommendation information indicates the one or more transmit beams to use:
the one or more transmit beams to use for the one or more DL transmissions during the transmission window comprise transmit beams associated with interference metrics, determined based on the plurality of RSs, less than or equal to an interference threshold metric, and
the DL transmission recommendation information further indicates the interference metrics for the one or more transmit beams to use, and
when DL transmission recommendation information indicates the one or more transmit beams to not use:
the one or more transmit beams to not use for the one or more DL transmissions during the transmission window comprise transmit beams associated with interference metrics, determined based on the plurality of RSs, greater than an interference threshold metric, and
the DL transmission recommendation information further indicates the interference metrics for the one or more transmit beams not to use.

4. The first network entity of claim 1, wherein the DL transmission recommendation information indicates at least one of:
a traffic priority associated with the one or more UL transmissions of the first network entity during the transmission window,
a traffic type associated with the one or more UL transmissions during the transmission window,
a signaling type associated with the one the one or more UL transmissions during the transmission window,
the one or more receive beams to be used by the first network entity for receiving the one or more UL transmissions during the transmission window, or
a beam pattern associated with the one or more receive beams to be used by the first network entity for receiving the one or more UL transmissions during the transmission window.

5. The first network entity of claim 1, wherein the DL transmission recommendation information indicates:
time and frequency resources associated with the one or more UL transmissions during the transmission window, and loading information for the time and frequency resources associated with the one or more UL transmissions during the transmission window.

6. The first network entity of claim 1, wherein:
the DL transmission recommendation information indicates loading information for the one or more receive beams to be used by the first network entity for receiving the one or more UL transmissions during the transmission window, and
the loading information indicates at least one of:
  a number of users per receive beam of the one or more receive beams, or
  a percentage of resource elements to be used per receive beam of the one or more receive beams.

7. The first network entity of claim 1, wherein the DL transmission recommendation information indicates a time division duplexing (TDD) pattern associated with the one or more UL transmissions.

8. The first network entity of claim 1, wherein the one or more processors are further configured to cause the first network entity to receive acknowledgement information from the second network entity for the DL transmission recommendation information.

9. The first network entity of claim 8, wherein the acknowledgement information comprises a negative acknowledgement (NACK), indicating that the second network entity will not adhere to the DL transmission recommendation information during the transmission window.

10. The first network entity of claim 9, wherein the acknowledgement information includes at least one of:
  an indication of a traffic priority associated with one or more DL transmissions to be transmitted by the second network entity during the transmission window and the traffic priority associated with the one or more DL transmissions is higher than a traffic priority associated with the one or more UL transmissions, or
  an indication of one or more transmit beams of the different transmit beams to be used by the second network entity for transmitting one or more DL transmissions during the transmission window.

11. The first network entity of claim 9, wherein, in order to take the one or more actions, the one or more processors are configured to cause the first network entity to one of:
  drop, based on the NACK, the one or more UL transmissions to be received via the one or more receive beams during the transmission window,
  receive the one or more UL transmissions via the one or more receive beams during the transmission window regardless of the NACK, or
  receive the one or more UL transmissions via the one or more receive beams in a subsequent transmission window, or
  receive the one or more UL transmissions via the one or more receive beams, wherein the different transmit beams of the second network entity do not interfere with the one or more receive beams of the first network entity.

12. The first network entity of claim 1, wherein:
the first network entity comprises a first distributed unit (DU) of a base station (BS),
the second network entity comprises a second DU of the BS, and
in order to transmit the DL transmission recommendation information to the second network entity, the one or more processors are configured to cause the first network entity to transmit the DL transmission recommendation information from the first DU to the second DU via a centralized unit (CU) of the BS.

13. The first network entity of claim 1, wherein:
the first network entity comprises a first distributed unit (DU) of a first base station (BS),
the second network entity comprises a second DU of a second BS, and
in order to transmit the DL transmission recommendation information to the second network entity, the one or more processors are configured to cause the first network entity to transmit the DL transmission recommendation information from the first DU to the second DU via a first centralized unit (CU) of the first BS and a second CU of the second BS.

14. A second network entity, comprising:
one or more processors configured to execute instructions stored on one or more memories and to cause the first network entity to:
  transmit a plurality of reference signals (RSs) to a first network entity associated with different transmit beams of the second network entity;
  receive, from the first network entity based on the plurality of RSs, DL transmission recommendation information for the second network entity to use during a transmission window; and
  take one or more actions related to transmitting one or more DL transmissions via one or more transmit beams of the different transmit beams during the transmission window based, at least in part, on the DL transmission recommendation information.

15. The second network entity of claim 14, wherein the DL transmission recommendation information indicates at least one of:
  one or more transmit beams of the different transmit beams of the second network entity to use for the one or more DL transmissions during the transmission window,
  one or more transmit beams of the different transmit beams of the second network entity to not use for the one or more DL transmissions during the transmission window,
  one or more time and frequency resources for the second network entity to use for the one or more DL transmissions during the transmission window, or
  one or more time and frequency resources for the second network entity to not use for the one or more DL transmissions during the transmission window.

16. The second network entity claim 15, wherein:
when DL transmission recommendation information indicates the one or more transmit beams to use:
  the one or more transmit beams to use for the one or more DL transmissions during the transmission window comprise transmit beams associated with interference metrics, determined based on the plurality of RSs, less than or equal to an interference threshold metric, and
  the DL transmission recommendation information further indicates the interference metrics for the one or more transmit beams to use, and
when DL transmission recommendation information indicates the one or more transmit beams to not use:
  the one or more transmit beams to not use for the one or more DL transmissions during the transmission window comprise transmit beams associated with interference metrics, determined based on the plurality of RSs, greater than an interference threshold metric, and the DL transmission recommendation information further indicates the interference metrics for the one or more transmit beams not to use.

17. The second network entity of claim 14, wherein the DL transmission recommendation information indicates at least one of:
 a traffic priority associated with one or more uplink transmissions to be received by the first network entity during the transmission window,
 a traffic type associated with one or more uplink transmissions to be received by the first network entity during the transmission window,
 a signaling type associated with one or more uplink transmissions to be received by the first network entity during the transmission window,
 one or more receive beams to be used by the first network entity for receiving one or more uplink transmissions during the transmission window,
 a beam pattern associated with one or more receive beams to be used by the first network entity for receiving one or more uplink transmissions during the transmission window, or
 a time division duplexing (TDD) pattern associated with one or more uplink transmissions to be received by the first network entity during the transmission window.

18. The second network entity of claim 14, wherein the DL transmission recommendation information indicates:
 time and frequency resources associated with one or more uplink transmissions to be received by the first network entity during the transmission window, and
 loading information for time and frequency resources associated with one or more uplink transmissions to be received by the first network entity during the transmission window.

19. The second network entity of claim 14, wherein:
 the DL transmission recommendation information indicates loading information for one or more receive beams to be used by the first network entity for receiving one or more uplink transmissions during the transmission window, and
 the loading information indicates at least one of:
  a number of users per receive beam of the one or more receive beams, or
  a percentage of resource elements to be used per receive beam of the one or more receive beams.

20. The second network entity of claim 14, wherein the one or more processors are configured to cause the second network entity to transmit acknowledgement information to the first network entity for the DL transmission recommendation information.

21. The second network entity of claim 20, wherein the acknowledgement information comprises a negative acknowledgement (NACK), indicating that the second network entity will not adhere to the DL transmission recommendation information during the transmission window.

22. The second network entity of claim 21, wherein the acknowledgement information includes at least one of:
 an indication of a traffic priority associated with the one or more DL transmissions to be transmitted by the second network entity during the transmission window and the traffic priority associated with the one or more DL transmissions is higher than a traffic priority associated with one or more uplink transmissions to be received by the first network entity during the transmission window, or
 an indication of the one or more transmit beams of the different transmit beams to be used by the second network entity for transmitting the one or more DL transmissions during the transmission window.

23. The second network entity of claim 21, wherein, in order to take the one or more actions, the one or more processors are configured to cause the second network entity to transmit, based on the NACK, the one or more DL transmissions via one or more transmit beams during the transmission window.

24. The second network entity of claim 14, wherein:
 the first network entity comprises a first distributed unit (DU) of a base station (BS),
 the second network entity comprises a second DU of the BS, and
 in order to receive the DL transmission recommendation information from the first network entity, the one or more processors are configured to cause the second network entity to receive the DL transmission recommendation information from the first DU via a centralized unit (CU) of the BS.

25. The second network entity of claim 14, wherein:
 the first network entity comprises a first distributed unit (DU) of a first base station (BS),
 the second network entity comprises a second DU of a second BS, and
 in order to receive the DL transmission recommendation information from the first network entity, the one or more processors are configured to cause the second network entity to receive the DL transmission recommendation information from the first DU via a first centralized unit (CU) of the first BS and a second CU of the second BS.

26. The second network entity of claim 14, wherein:
 the second network entity comprises a centralized unit (CU) of a base station (BS),
 the one or more processors are further configured to cause the second network entity to:
  receive additional DL transmission recommendation information from one or more additional network entities for a transmission window;
  determine, based on the DL transmission recommendation information from the first network entity any the additional DL transmission recommendation information from the one or more additional network entities, scheduling information for the one or more DL transmissions;
  send the scheduling information to a distributed unit (DU) of the base station to transmit the one or more DL transmissions; and
  send the scheduling information to at least one of the first network entity or the one or more additional network entities.

27. The second network entity claim 14, wherein, in order to receive the DL transmission recommendation information, the one or more processors are configured to cause the second network entity to receive the DL transmission recommendation information via at least one of a backhaul network or over the air.

28. The second network entity claim 14, wherein, in order to take the one or more actions, the one or more processors are configured to cause the second network entity to one of:
 drop the one or more DL transmissions via one or more transmit beams during the transmission window,
 transmit the one or more DL transmissions via the one or more transmit beams in a subsequent transmission window, transmit the one or more DL transmissions via the one or more transmit beams in the transmission window regardless of the DL transmission recommendation information, or transmit the one or more DL transmissions via the one or more transmit beams in the transmission window, wherein the one or more transmit beams of the second network entity do not interfere with one or more receive beams of the first network entity.

* * * * *